(12) United States Patent
Smith et al.

(10) Patent No.: US 8,713,201 B2
(45) Date of Patent: *Apr. 29, 2014

(54) METHOD AND SYSTEM FOR THE ASSIGNMENT OF SECURITY GROUP INFORMATION USING A PROXY

(75) Inventors: Michael R. Smith, San Jose, CA (US); Awais B. Nemat, San Jose, CA (US); Michael Fine, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/788,467

(22) Filed: May 27, 2010

(65) Prior Publication Data

US 2010/0235544 A1    Sep. 16, 2010

Related U.S. Application Data

(63) Continuation of application No. 11/837,958, filed on Aug. 13, 2007, now Pat. No. 7,840,708.

(51) Int. Cl.
*G06F 15/16* (2006.01)
*G06F 15/173* (2006.01)
*G06F 15/177* (2006.01)
*H04L 29/06* (2006.01)

(52) U.S. Cl.
CPC ............ *H04L 63/104* (2013.01); *H04L 63/083* (2013.01); *H04L 63/08* (2013.01)
USPC ................. 709/246; 705/245; 726/5; 726/28; 711/118; 713/171

(58) Field of Classification Search
CPC ...... H04L 63/104; H04L 63/083; H04L 63/08
USPC ................ 709/245, 246, 217–228; 726/5, 28; 711/118; 713/171; 707/1
See application file for complete search history.

(56) References Cited

U.S. PATENT DOCUMENTS

| 4,922,486 A | 5/1990 | Lidinsky et al. ............... 370/427 |
| 5,017,917 A | 5/1991 | Fisher .......................... 340/14.1 |

(Continued)

FOREIGN PATENT DOCUMENTS

| EP | 0 465 016 A2 | 6/1991 | ............... G06F 1/00 |
| EP | 0 697 662 A1 | 2/1996 | ............. G06F 12/14 |

(Continued)

OTHER PUBLICATIONS

Islam, An Access Control Method with Subject-Object Key and Time Stamp, Jun. 2003, Malaysian Journal of Computer Science, vol. 16, No. 1, pp. 77-83.

(Continued)

*Primary Examiner* — Haresh N Patel
(74) *Attorney, Agent, or Firm* — Campbell Stephenson LLP

(57) ABSTRACT

A method and system for the assignment of security group information using a proxy is disclosed. The method includes receiving an address of a network device at a first network device, receiving a security group of the network device at the first network device and associating the address information and the security group information with one another at the first network device. The first network device is coupled to a second network device. The address is represented by address information, which is received from the second network device. The security group is identified using the security group information, which indicates the network device is a member of the security group. The address information and the security group information are associated with one another by storing the address information and the security group information at the first network device.

13 Claims, 17 Drawing Sheets

(56) References Cited

U.S. PATENT DOCUMENTS

| | | | |
|---|---|---|---|
| 5,113,442 A | 5/1992 | Moir | 713/167 |
| 5,251,205 A | 10/1993 | Callon et al. | 370/392 |
| 5,615,264 A | 3/1997 | Kazmierczak | 705/52 |
| 5,764,762 A | 6/1998 | Kazmierczak | 705/52 |
| 5,787,427 A | 7/1998 | Benantar et al. | 707/9 |
| 5,845,068 A | 12/1998 | Winiger | 726/3 |
| 5,911,143 A | 6/1999 | Deinhart et al. | 707/103 |
| 5,941,947 A | 8/1999 | Brown | 709/225 |
| 5,968,177 A | 10/1999 | Batten-Carew et al. | 726/4 |
| 6,014,666 A | 1/2000 | Helland | 707/9 |
| 6,023,765 A | 2/2000 | Kuhn | 726/4 |
| 6,052,456 A | 4/2000 | Huang | 379/201.04 |
| 6,088,659 A | 7/2000 | Kelley et al. | 702/62 |
| 6,092,191 A | 7/2000 | Shimbo et al. | 713/153 |
| 6,202,066 B1 | 3/2001 | Barkley et al. | 707/9 |
| 6,212,558 B1 | 4/2001 | Antur et al. | 709/221 |
| 6,233,618 B1 | 5/2001 | Shannon | 709/229 |
| 6,271,946 B1 | 8/2001 | Chang et al. | 398/79 |
| 6,289,462 B1 | 9/2001 | McNabb | 713/201 |
| 6,292,798 B1 | 9/2001 | Dockter | 707/9 |
| 6,292,900 B1 | 9/2001 | Ngo et al. | 726/6 |
| 6,304,973 B1 | 10/2001 | Williams | 726/3 |
| 6,405,259 B1 | 6/2002 | Cheston et al. | 709/245 |
| 6,449,643 B1 | 9/2002 | Hyndman | 709/223 |
| 6,711,172 B1 | 3/2004 | Li | 370/401 |
| 6,754,214 B1 | 6/2004 | Mahalingaiah | 370/392 |
| 6,823,462 B1 | 11/2004 | Cheng et al. | 726/15 |
| 6,973,057 B1 | 12/2005 | Forslow | 370/328 |
| 6,985,948 B2 | 1/2006 | Taguchi et al. | 709/225 |
| 7,000,120 B1 | 2/2006 | Koodli et al. | 713/1 |
| 7,032,243 B2 | 4/2006 | Leerssen et al. | 726/17 |
| 7,136,374 B1 | 11/2006 | Kompella | 370/352 |
| 7,185,365 B2 | 2/2007 | Tang et al. | 726/13 |
| 7,207,062 B2 | 4/2007 | Brustoloni | 726/13 |
| 7,284,269 B2 | 10/2007 | Marquet et al. | 726/13 |
| 7,350,077 B2 | 3/2008 | Meier et al. | 713/171 |
| 7,417,950 B2 | 8/2008 | Hofmeister et al. | 370/230 |
| 7,434,045 B1 | 10/2008 | Enderwick et al. | 713/158 |
| 7,437,755 B2 | 10/2008 | Farino et al. | 726/5 |
| 7,506,102 B2 * | 3/2009 | Lev-Ran et al. | 711/118 |
| 7,519,986 B2 | 4/2009 | Singhal | 726/2 |
| 7,530,112 B2 | 5/2009 | Smith | 726/28 |
| 7,660,259 B1 | 2/2010 | Grosser et al. | 370/252 |
| 7,836,490 B2 | 11/2010 | Smith | 726/4 |
| 8,302,157 B2 | 10/2012 | Smith | 726/2 |
| 2002/0026592 A1 | 2/2002 | Gavrila et al. | 726/6 |
| 2002/0034962 A1 | 3/2002 | Yokoyama | 455/519 |
| 2002/0035635 A1 | 3/2002 | Holden | 709/230 |
| 2002/0184521 A1 | 12/2002 | Lucovsky et al. | 713/200 |
| 2003/0051155 A1 | 3/2003 | Martin | 726/4 |
| 2003/0065799 A1 | 4/2003 | Kitamura | 709/230 |
| 2003/0088786 A1 | 5/2003 | Moran et al. | 726/4 |
| 2003/0110268 A1 | 6/2003 | Kermarec et al. | 709/227 |
| 2003/0140246 A1 | 7/2003 | Kammer et al. | 713/201 |
| 2003/0145232 A1 | 7/2003 | Poletto et al. | 726/22 |
| 2003/0154400 A1 | 8/2003 | Pirttimaa | 726/14 |
| 2003/0177381 A1 | 9/2003 | Ofek et al. | 713/200 |
| 2003/0196108 A1 | 10/2003 | Kung | 713/200 |
| 2004/0017816 A1 | 1/2004 | Ishwar et al. | 370/395.53 |
| 2004/0044908 A1 | 3/2004 | Markham et al. | 726/28 |
| 2004/0064688 A1 | 4/2004 | Jacobs | 713/150 |
| 2004/0073788 A1 | 4/2004 | Kim et al. | 713/160 |
| 2004/0156313 A1 | 8/2004 | Hofmeister et al. | 370/229 |
| 2004/0160903 A1 | 8/2004 | Gai et al. | 370/254 |
| 2004/0181690 A1 | 9/2004 | Rothermel et al. | 726/1 |
| 2004/0202171 A1 | 10/2004 | Hama | 370/395.1 |
| 2004/0264697 A1 | 12/2004 | Gavrilescu et al. | 380/255 |
| 2004/0268123 A1 | 12/2004 | Le et al. | 713/160 |
| 2005/0055573 A1 | 3/2005 | Smith | 726/4 |
| 2005/0094652 A1 | 5/2005 | Waclawsky et al. | 370/401 |
| 2005/0097357 A1 | 5/2005 | Smith | 726/4 |
| 2005/0125692 A1 | 6/2005 | Cox et al. | 713/201 |
| 2005/0129019 A1 | 6/2005 | Cheriton | 370/392 |
| 2005/0177717 A1 | 8/2005 | Grosse | 713/160 |
| 2005/0190758 A1 | 9/2005 | Gai et al. | 370/389 |
| 2005/0198412 A1 | 9/2005 | Pedersen | 710/30 |
| 2006/0010483 A1 | 1/2006 | Buehler | 726/1 |
| 2006/0090208 A1 | 4/2006 | Smith | 726/26 |
| 2006/0106750 A1 * | 5/2006 | Smith | 707/1 |
| 2006/0112425 A1 | 5/2006 | Smith et al. | 726/13 |
| 2006/0112426 A1 | 5/2006 | Smith et al. | 726/13 |
| 2006/0112431 A1 | 5/2006 | Finn et al. | 726/22 |
| 2006/0117058 A1 | 6/2006 | Smith | 1/1 |
| 2007/0094716 A1 | 4/2007 | Farino et al. | 726/5 |
| 2007/0110248 A1 | 5/2007 | Li | 380/278 |
| 2009/0019538 A1 | 1/2009 | Pandya | 726/13 |
| 2009/0049196 A1 * | 2/2009 | Smith et al. | 709/245 |
| 2009/0097490 A1 * | 4/2009 | Sanderson et al. | 370/395.53 |
| 2009/0328186 A1 | 12/2009 | Pollutro et al. | 726/13 |
| 2010/0223657 A1 | 9/2010 | Finn et al. | 726/3 |
| 2011/0004923 A1 | 1/2011 | Smith et al. | 726/4 |
| 2011/0119752 A1 | 5/2011 | Smith et al. | 726/13 |

FOREIGN PATENT DOCUMENTS

| | | | | |
|---|---|---|---|---|
| EP | | 0 849 680 A2 | 12/1997 | G06F 12/14 |
| EP | | 1 067 745 A2 | 11/1999 | H04L 29/06 |
| JP | | 2002 164937 | 6/2002 | H04L 12/66 |
| WO | WO 2005/027464 | | 3/2005 | H04L 29/06 |

OTHER PUBLICATIONS

Barkley et al, Supporting Relationships in Access Control Using Role Based Access Control, Jul. 1999.

Pfleeger et al., Security in Computing, 2003, Prentice Hall, 3$^{rd}$ Edition, pp. 194-207, Dec. 31.

Valenzi, Kathleen D., Digital Signatures: An Important "Sign" of the Future of E-Government Copyright 2000 The Rector and Board of Visitors of the University of Virginia, 6 pages, Dec. 31.

Microsoft Computer Dictionary, Fifth Edition, Pub Date: May 1, 2002, Excerpt of terms: digital signature—digital signature standard & routable protocol—routing table, p. 656.

CDAT Overview, http://www.cisco/com/universaled/cc/td/doc/, Solution/sesm/sesm_313toolguid/chi1_overview.htm. Copyright 1992-2002 Cisco Systems, Inc., Dec. 31, 2002.

Stevens, Richard W., TCP/IP Illustrated vol. 1, The Protocols, Copyright © 1994 Addison Wesley Longman, Inc., pp. 112-117. Dec. 31.

IEEE Standard for Information Technology—Telecommunications and Information Exchange Between Systems—Local and Metropolitan Area Networks—Common Specifications, *Part 3: Media Access Control (MAC) Bridges*, ANSI/IEEE Std. 802.ID, 1998 Edition, Dec. 10, 1998, pp. 1-355.

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Wang, Ning and Pavlou, George, Scalable sender access control for bi-directional multicast routing, Computer Newtorks, Elsevier Science Publishers B.V., vol. 43, No. 5, Dec. 5, 2003, pp. 539-555.

* cited by examiner

*Fig. 3*

METHOD AND SYSTEM FOR THE ASSIGNMENT OF SECURITY GROUP INFORMATION USING A PROXY

CROSS REFERENCE TO RELATED APPLICATIONS

This application is a continuation of U.S. application Ser. No. 11/837,958, entitled "Method and System for the Assignment of Security Group Information Using a Proxy," filed Aug. 13, 2007, and naming Michael R. Smith, Awais B. Nemat and Michael N. Fine as inventors, now U.S. Pat. No. 7,840,708, which issued Nov. 23, 2010. This application is incorporated by reference herein, in its entirety and for all purposes.

BACKGROUND OF THE INVENTION

1. Field of the Invention

This invention relates to the field of information network security, and more particularly to a method and system for the assignment of security group information to network traffic by a proxy for the source of the traffic.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. As will be appreciated, increased mobility and ease-of-access are very desirable qualities in today's compute-intensive business climate.

At the same time, the security afforded while providing such access is of increasing concern. Therefore, technologies based on Remote Authentication Dial-In User Service (RADIUS), Terminal Access Controller Access Control System (TACACS) and other protocols are employed to allow a user, device or other network entity to be authenticated upon entry into the network. Such technologies thus support the authentication of, authorization of, and accounting for (AAA) network entities desiring admittance to the network, which is a model for access control. The function of authentication allows a network entity to prove their identity (i.e., they are who they represent themselves to be). Thus, authentication answers the question: Who is this network entity? The function of authorization allows a network administrator or other person/network entity having the proper authority, to define what other network entities are allowed (and not allowed) to do. Thus, authorization answers the question: What is this network entity authorized to do? The function of accounting is to keep track of what a network entity does. Thus, accounting answers the question: What did the network entity in question do while having access to the network?

As is known, communications paths across such networks are conceptually separate (e.g., can be viewed as separate virtual paths), although they may traverse some or all of the same network devices (i.e., physical segments), and so are often controlled separately using some manner of access control mechanism. Conventionally, constraints upon access enjoyed by network entities are enforced by such access control mechanisms, which are often configured to process packets and so control such network entities' network traffic.

However, certain network devices may not support processing of the access information needed to implement certain security paradigms. While such devices, sometimes referred to as legacy devices, are often amenable to having their hardware upgraded, such hardware upgrades are both costly and logistically challenging, particularly when an enterprise might have hundreds or thousands of such network devices that would need to be upgraded. Alternatively, an upgrade to support the necessary processing might be effected in software (i.e., a software upgrade). Unfortunately, performing all such processing in software can often result in unacceptably high resource requirements, processing being slowed to unacceptable levels and/or other untenable consequences.

What is required, then, is a mechanism that allows for the gradual introduction of security upgrades, without necessitating upgraded hardware in the network device being upgraded, nor the upgrade's implementation completely in software. Preferably, such an approach should be compatible with existing technology, as well as future upgrades to that technology, thus reducing or eliminating the problem of integrating the technology existing or future network devices or networks. Also preferably, such an approach should allow the network to be easily reconfigured and grow, without incurring a disproportionate administrative burden or consuming inordinately large amounts of network resources. Such an approach should also minimize the amount of unnecessary network traffic.

BRIEF DESCRIPTION OF THE DRAWINGS

The present invention may be better understood, and numerous objects, features, and advantages made apparent to those skilled in the art by referencing the accompanying drawings.

FIG. 3 is a diagram illustrating an example of an access control list (ACL) according to embodiments of the present invention.

The use of the same reference symbols in different drawings indicates similar or identical items.

DETAILED DESCRIPTION OF THE INVENTION

Figure 1A:
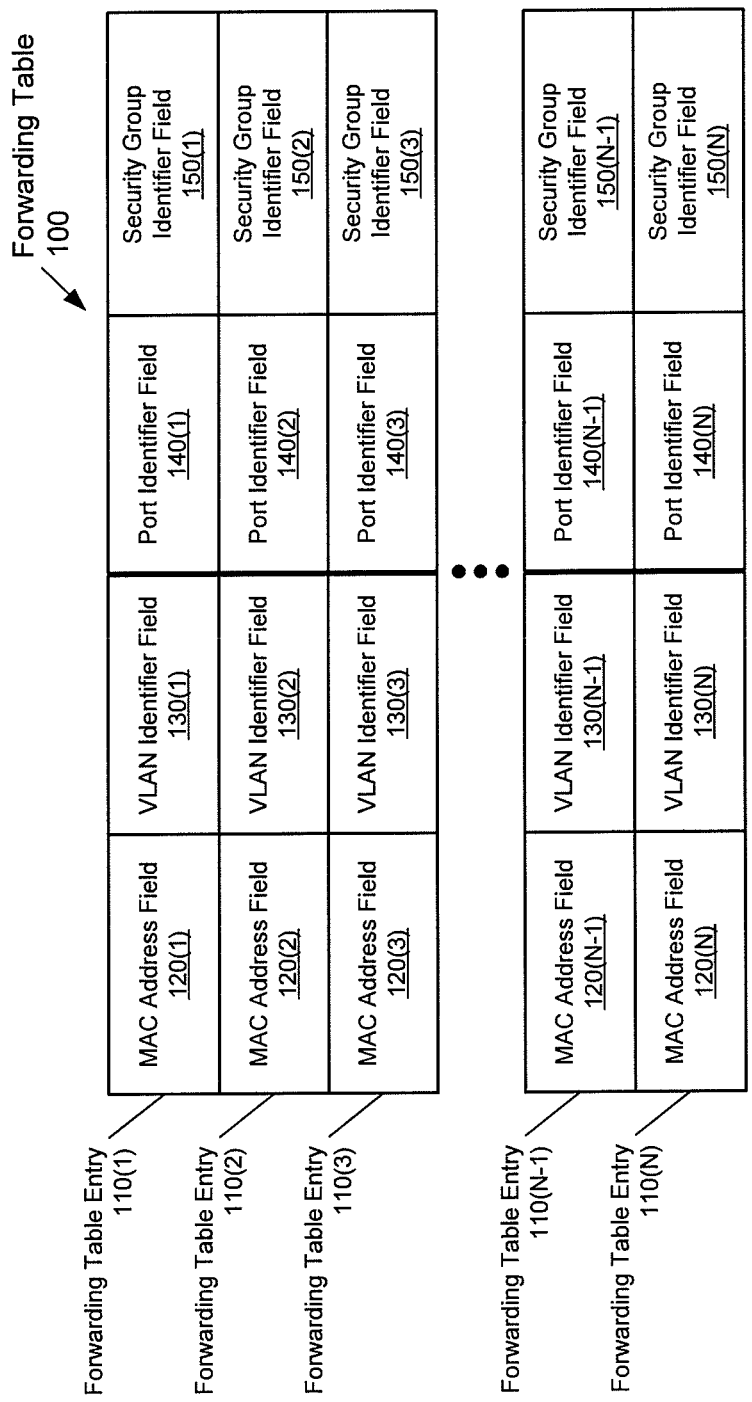
FIG. 1A is a diagram illustrating a forwarding table according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a method and system that addresses the needs outlined above by providing a protocol that permits the re-assignment of certain packet processing functions from one network device (lacking support for the packet processing in question) to another network device (having the requisite functionality). A method and system according to the present invention supports the transfer of certain packet processing functions from a first network device to a second network device by providing a protocol that supports the transfer of information needed to perform such processing from the first network device to the second network device.

Such functions, as described subsequently, are preferably performed in hardware. It is desirable to transfer functions that would otherwise be performed by the first network device, to the second network device, in situations in which the first network device lacks the requisite functionality, particularly if the first network device lacks support for support such processing. The transfer of these functions is desirable because the first network device, in scenarios giving rise to the need for the present invention, lacks the hardware support (or at least, the appropriate hardware configuration) for adding (e.g., inserting or otherwise associating) the requisite information to (in/with) the packets being transmitted. The second network device, as would be expected in light of the present disclosure, includes the requisite hardware (and/or the appropriate hardware configuration) to perform the functions in question. Thus, the security group information needed to perform these functions needs to be transferred from the first network device (which would normally receive such information (and, in fact, does)).

It is the communications needed to effect this transfer, and the functions associated therewith, that are afforded by embodiments of the present invention. The security group information processing in question having been off-loaded, the first network device is only in need of a software upgrade that allows the first network device to receive and forward (and, possibly, maintain) the requisite security group information. Having thus provided the second network device with the requisite security group information, along with the second network device having the processing capabilities needed to perform the security group information processing, the first and second network devices (thus implemented with an embodiment of the present invention) are able to provide the functionality of a first and second network device with hardware support needed for their respective security group information processing capabilities.

Moreover, it will often be desirable to introduce the hardware capabilities needed to support such processing, in a gradual manner. This is especially true in light of the typical investment in legacy (i.e., older existing) network devices made by a given enterprise. Thus, such a scenario introduces a migration issue for the enterprise, making incremental upgrades to the enterprise's network preferable. This migration issue also militates towards delaying the upgrading of the portion of the network containing the most hardware in need of such upgrades. By allowing the bulk of the legacy network devices within an enterprise's network to be upgraded later (and in an incremental manner), the enterprise is able to upgrade such network devices at a measured, controllable pace, as dictated by the enterprise's needs, resources and other such factors.

More specifically, as will be appreciated, the most prevalent device in a network is typically a lower-layer network device such as an access layer switch. As noted earlier, and as will also be appreciated, upgrading all such network devices (e.g., all access layer switches in a given network) at once can be very expensive; both in terms of capital expenditure, as well as operational expenditure. Therefore, it is likely desirable to permit the existence of some number of such legacy network devices (e.g., legacy access layer switches) in a secure networking environment (even to the extent of all such legacy network devices, at least initially). Because, in the typical embodiment, authentication occurs at the ingress network device, authentication typically occurs in the access layer switch, although the associated distribution layer switch can also be enlisted to perform these duties. Unfortunately, performing authentication in the distribution layer switch on behalf of the access layer switch is not only less secure, but also requires a solution other than authentication based on standard authentication techniques (e.g., a networking standard such as Institute of Electrical and Electronic Engineers (IEEE) 802.1x). A solution is to upgrade the hardware and software installed on the distribution layer network device (e.g., distribution layer switch), simplifying the logistical implications of this approach (that, simply as a result of the substantially fewer number of network devices involved). With regard to the end system (e.g., Internet Protocol (IP) telephone, personal computer (PC) or the like), such a solution requires at most a software upgrade. Similarly, with regard to the network device by which the end system accesses the distribution layer network device (e.g., the access layer network device (or access layer switch)), only a software upgrade is needed, a much simpler alternative, in relative terms. This, rather than the substantially more involved hardware upgrade that would be necessitated by the situation otherwise. Thus, while the distribution layer network device is (or is upgraded to be) security-enabled, the access layer network device can remain legacy (from a hardware perspective), needing only an easily implemented software upgrade.

The upgraded software on the access layer network device includes software to allow authentication of end systems (in conformance with embodiments of the present invention), as well as support for an additional protocol referred to herein as an SGT Exchange Protocol (SXP). SXP is a control protocol that runs, for example, between the access layer network device and the distribution layer network device. In this scenario, the distribution layer network includes security-enabled hardware, capable of processing packets based on security group information associated therewith. In this scenario, the authentication process is performed on the access layer network device in a manner comparable to that performed by an access layer network device having security-group-enabled hardware. However, because the access layer network device lacks such hardware, the associated processing is not performed. For example, this might include data traffic not being encrypted or cryptographically authenticated when passing through the access layer network device.

As noted, such an access layer network device's hardware is not configured to insert security group information into the packet. SXP is used to pass the requisite network addresses of the authenticated network device and the security group information passed to the access layer network device as part of the authentication process to the distribution layer switch. The distribution layer network device (the distribution layer switch), having this information, is then able to insert the security group information into the packet on behalf of the access layer network device. In one embodiment, on the egress side, the access layer network device is similarly incapable of performing the requisite security group information processing. Thus, in this embodiment, the enforcement of the security paradigm then take place at the egress distribution layer network device interface on the distribution layer switch. It is therefore apparent that, despite the fact that the access layer network devices lack hardware support for the security group information processing needed to support a security paradigm such as that described herein, the benefits of such a security paradigm can still be enjoyed by the network, by off-loading the requisite processing to the distribution layer network device's associated therewith, using a protocol of the present invention.

The present invention provides a number of advantages, among them the following. A fundamental advantage of the present invention is the simplification of the process of migrating a network (and so the network devices that make up the network) to support the use of security groups, and so the ability of legacy network devices to enjoy the benefits of security groups. As discussed elsewhere herein, the localization of such processing provided by the present invention is especially advantageous in scenarios in which the network devices being off-loaded are ubiquitous (e.g., legacy access layer network devices). The present invention also provides a scaleable technique for off-loading the requisite packet processing with regard to security group information, while resulting in minimal software overhead in the network device from which the processing is off-loaded. The present invention, of course, does not require additional hardware support, either on the network devices being off-loaded (which merely have minor software upgrades installed) or the network devices to which the processing is off-loaded (those devices being selected as a result of their existing hardware support therefor). Moreover, the present invention does not require network topology changes, and can easily be adapted to changes within the network. As also discussed elsewhere herein, the present invention is extensible, allowing off-loading from one network device to another, and the off-loading from the other network device to yet another network device. This provides the ability to off-load the requisite processing from one network device to another, until a network device (having the hardware support necessary to perform the requisite processing) is finally reached.

Security Groups in an Authentication Architecture

In one embodiment of the present invention, hierarchical security groups (SGs) are defined to include a number of groups, each having a hierarchical relationship to one or more other groups. Each child group inherits permissions from its parent group and extends those permissions with its own. Typically, a user in a child security group will have access to more of the computing and informational resources of the organization than will a user in parent security group. As will be apparent, the further one traverses down in a security group hierarchy, in one embodiment, the greater the level of responsibility, and so, the greater the amount of access.

Alternatively, disjoint SGs can be used where there are non-overlapping, equal, and non-related functions. In the actual implementation of RBACLs, hierarchical SGs can be implemented using disjoint SGs and the hierarchy management (if present) can be made the responsibility of the network management entity responsible for configuring the RBACLs. Such disjoint SGs are used in situations in which there are non-overlapping, equal and non-related functions performed by the groups in question. Because the responsibilities of each of these groups is so different and distinct from that of the other groups, each of these groups would be expected to have their own set of resources, accessible by members of the given group. Thus, it would expected that the users in a given security group would maintain the same set of permissions, allowing them access to the same set of resources, although this need not strictly be the case.

It will be appreciated that groups of users are put into the same group because they share the same permissions. This creation of groups does not imply that no communications occur between or across security groups. Nor does this imply that there is no permission enforcement within a given group. It simply implies that as a group, the users will have substantially the same privileges within the network.

More detailed examples of security group hierarchies and disjoint security groups are given in patent application Ser. No. 10/659,614, filed Sep. 10, 2003, and entitled "Method and Apparatus for Providing Network Security Using Role-Based Access Control," having Michael R. Smith as inventor. Information regarding an example of a protocol and architecture that can be used in implementing certain features of the networks described herein can be found in patent application Ser. No. 10/696,629, filed Oct. 29, 2003, and entitled "Method And Apparatus For Providing Network Security Using Security Labeling," also having M. Smith as inventor. These applications are hereby incorporated by reference herein, in their entirety and for all purposes.

The implementation of RBACLs typically includes a number of operations. These operations include
 1. Source Security group (SSG) determination
 2. Destination Security group (DSG) determination
 3. Permissions determination
 4. Permissions enforcement These operations are described in connection with FIGS. 1A-6, below.

Implementation of Security Groups in a Security-Group-Enabled Network Architecture FIG. 1A is a block diagram illustrating a forwarding table 100 according to the present invention. Forwarding table 100 includes a number of forwarding table entries (depicted in FIG. 1A as forwarding table entries 110(1)-(N)). Each of forwarding table entries 110(1)-(N) includes a number of fields, certain of which are depicted in FIG. 1. Among these fields are a MAC address field (depicted as MAC address fields 120(1)-(N)), a virtual local area network (VLAN) identifier field (depicted as VLAN identifier fields 130(1)-(N)), a port identifier field (depicted as port identifier fields 140(1)-(N)), and a security group identifier (tag) field (depicted as security group identifier fields 150(1)-(N)).

When the media access control (MAC) address and VLAN have been authenticated on a given port, the security group retrieved during the authentication process is assigned to the MAC address/VLAN identifier combination. This information appears in forwarding table 100 in MAC address fields 120(1)-(N) and VLAN identifier fields 130(1)-(N). Forwarding table 100 thus contains the MAC address/VLAN identifier combinations that can be used as a look-up key with the result of the look-up providing the port identifier (as stored in the appropriate one of port identifier fields 140(1)-(N)) and the security group identifier (as stored in a corresponding one of security group identifier fields (150(1)-(N)).

It will be noted that, in one implementation, when a packet is sent by a host, the Layer 2 (Layer 2 (L2) of the Open Systems Interconnect (OSI) protocol stack) learning look-up (provided as part of functionality in the network switch that maintains forwarding table 100) also derives the security group identifier for the packet by looking up the packet's contents in the forwarding table. Alternatively, the switch's L2 learning look-up can be designed to extract the security group identifier from the packet itself. This security group identifier is used to tag the packet for identification as having been generated by a user in the given security group. Such a tag is referred to herein as a source group tag (SGT). The SGI is inserted into the packet for use in the subsequent processing of the packet. For example, the SGI can be inserted into the L2 header, making such information available to Layer 3 (L3) routers, as well as L2 switches.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Before the appropriate RBACL can be applied, a determination is also made as to the destination security group. While a number of mechanisms can be used to make such a determination, two ways to determine the DSG of the object (server) are now discussed. As will be appreciated, each has its own advantages in certain scenarios.

The first mechanism to determine a DSG employs information in the forwarding information base (FIB) provided during address resolution by the address resolution protocol (ARP) (i.e., the IP FIB). For most cases involving network traffic using IP, the destination security group can be derived from the FIB. On the egress edge of the network (e.g., the network device operating at Layer 3 (L3), referred to herein as the distribution layer network device, operating at the edge of the core network), referred to herein as, the FIB will be populated with the resolved host prefix after ARP resolution is performed. Since the ARP response is the trigger for the FIB entry update and needs to be received before any traffic flows to the host, the ARP response is used as the trigger to insert information regarding the destination's security group into the FIB entry.

Alternatively, the destination security group can be determined via a static ingress ACL. As will be appreciated, when connecting an RBACL-enabled network to a non-RBACL-enabled network, the authentication infrastructure will not be present in the non-RBACL-enabled network. In a manner similar to assigning the source security group described previously, the destination security group needs to be classified via the same mechanism in such situations. By using the ingress ACL to provide the destination security group classification, the destination IP addresses/sub-nets can indicate the destination security group to determine the correct RBACL to apply. It will be noted that the egress ACL may also be used, so long as the DSG determination occurs before the RBACL enforcement.

Figure 1B:
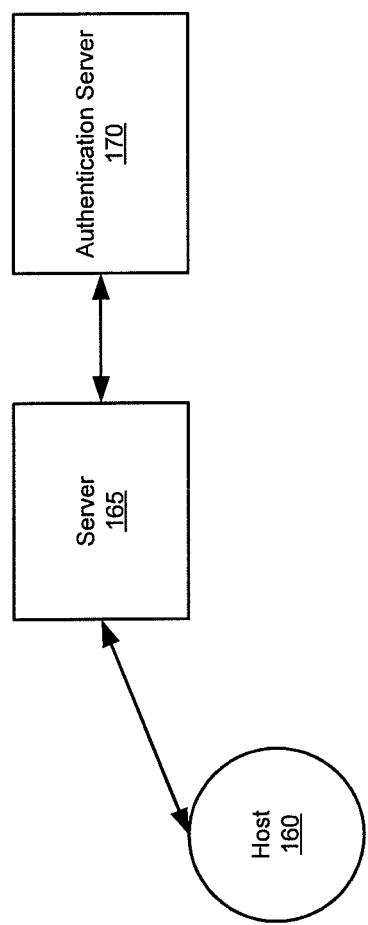
FIG. 1B is a block diagram illustrating an example of a network architecture including a host, a server and an authentication server, according to embodiments of the present invention.

FIG. 1B is a block diagram illustrating an architecture for user authentication. Security group determination can be made, for example, when the user is authenticated on the network. The following examples can use, for example, the remote authentication dial-in user server (RADIUS) protocol, which provides centralized authentication, authorization and accounting for various types of access. User authentication is initiated by a user, who attempts to log in to a host 160. The user (not shown) causes host 160 to act as a supplicant, and so, send a start message to a server 165 (also referred to as an authenticator). Server 165 responds to host 160 with a request/identify message, to which host 160 responds with a response/identity message, based on the user's response. This response/identity message can be, for example, the typical user name and password combination. Server 165 passes this information to an authentication server 170.

Authentication server 170 responds with an access-challenge. It will be noted that a variety of exchanges occur between server 165 and authentication server 170 during authentication, and that these are meant to be merely exemplary. Such exchanges will vary, depending on the authentication protocol employed. Once the access-challenge exchange has completed, server 165 interacts with host 160 by forwarding the challenge from authentication server 170 to host 160. Host 160, in this example, responds with a one time password (OTP), which server 165 forwards to authentication server 170. Assuming that the password is accepted by authentication server 170, authentication server 170 responds with an access-accept message that causes server 165 to authorize a network address for host 160.

Thus, this authentication process allows for the dissemination of user group information in network architectures that include network devices that support the generation, dissemination and processing of security group information. In such an environment, an authentication procedure such as that presented in connection with FIG. 2 to provide the ability to transport the user's group membership from authentication server 170 to an ingress network access device. In the RADIUS protocol, a vendor-specific attribute containing the user group to be passed to server 165 (and, ultimately, to the ingress switch) uses the RADIUS access-accept response. Thus, the source user group determination is made when the user is authenticated on the network. Alternatively, if the host's operating system is trusted, the user group can come from the host itself. If such is the case, each application may tag packets the application generates in a manner different from the tagging performed by other applications, thus basing the given packet's tag on the application sourcing the packet.

It will be noted that, in the original IEEE 802.1X specification, the entire port is authenticated when a single valid authentication is made on the port. Thereafter, any host attached to that port is considered authenticated. In the same manner, the simplest method of obtaining the source group tag (SGT) is to mark the entire port as authenticated upon the first valid authentication. The group identifier provided by the initial authentication is then used and installed in the ingress port.

Figure 1C:
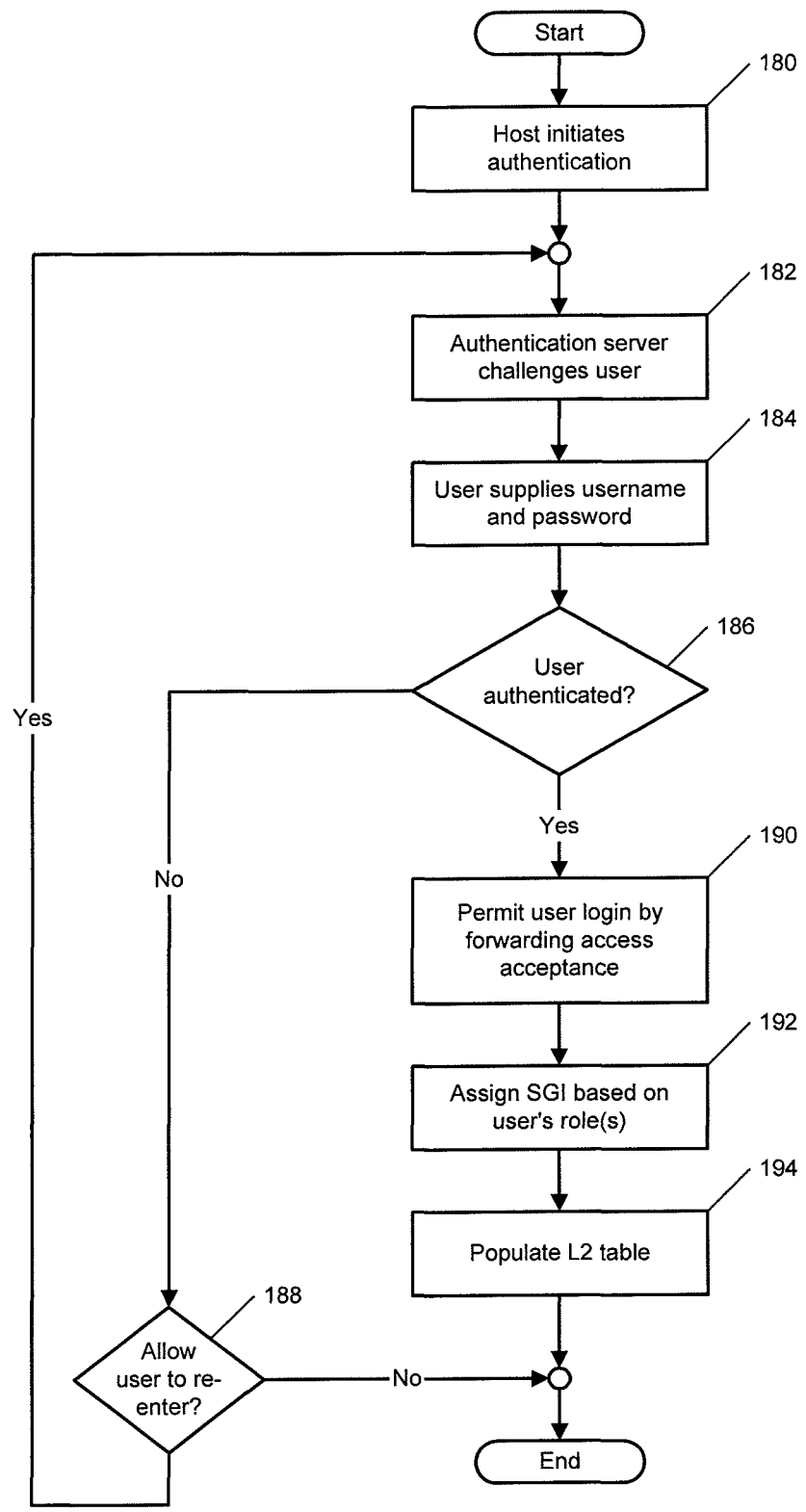
FIG. 1C is a flow diagram illustrating an example of the operation of the architecture of FIG. 1B in authenticating a user, according to embodiments of the present invention.

FIG. 1C is a flow diagram illustrating an example of the operation of the architecture for user authentication shown in FIG. 1B, in which the network devices involved support the generation, dissemination and processing of security group information. The process begins with host 160 initiating the authentication process (step 180). Next, a challenge is issued from authentication server 170, to challenge the user for their user name and password (again, in the manner described in connection with FIG. 1B) (step 182). In response to this challenge, the user supplies their username and password (step 184). A determination is then made as to whether authentication server 170 can authenticate the user (step 186). If the user can not be authenticated, a determination is made as to whether or not to allow the user to re-enter their username and password (step 188). If the re-entry of this information is acceptable, process loops to the challenging of the user by authentication server 170 (step 182). Otherwise (e.g., if either this re-entry has been allowed a maximum a number of times or is not allowed at all), the process ends.

Alternatively, if the user is successfully authenticated (step 186), the user is permitted to log in, which is accomplished by forwarding access acceptance to host 160 (step 190). Additionally, an SGT is assigned based on the user's role(s) (step 192). This, along with other information, is used to populate the layer 2 table (i.e., a forwarding table such as forwarding table 100 of FIG. 1A, or some comparable construct) maintained by switch 165 (step 194). This completes the process of user login.

As will be appreciated by one of skill in the art, in light of the present disclosure, the process depicted in FIG. 1C assumes that the network devices involved in the generation, dissemination and processing of security group information are capable of providing the functionality necessary and appropriate to those tasks for which the network device in question is responsible. Thus, these network devices operate as stand-alone network devices, and so are in no need of support or assistance from others of the network architecture's network devices for supplemental functionality in this regard. If such is not the case, steps can be taken to provide the requisite functionality by having those security-group-capable (or SG-capable) network devices provide some portion of that functionality, as an adjunct to the non-SG-capable network device, or in place thereof.

As noted, FIG. 1C depicts a flow diagram illustrating a process according to an embodiment of the present invention, as do other of the figures depicting a flow diagram that are discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits, volatile storage media including registers, buffers or caches, main memory, RAM, and the like. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

An Example of a Software-Based Permissions Architecture

Figure 2:
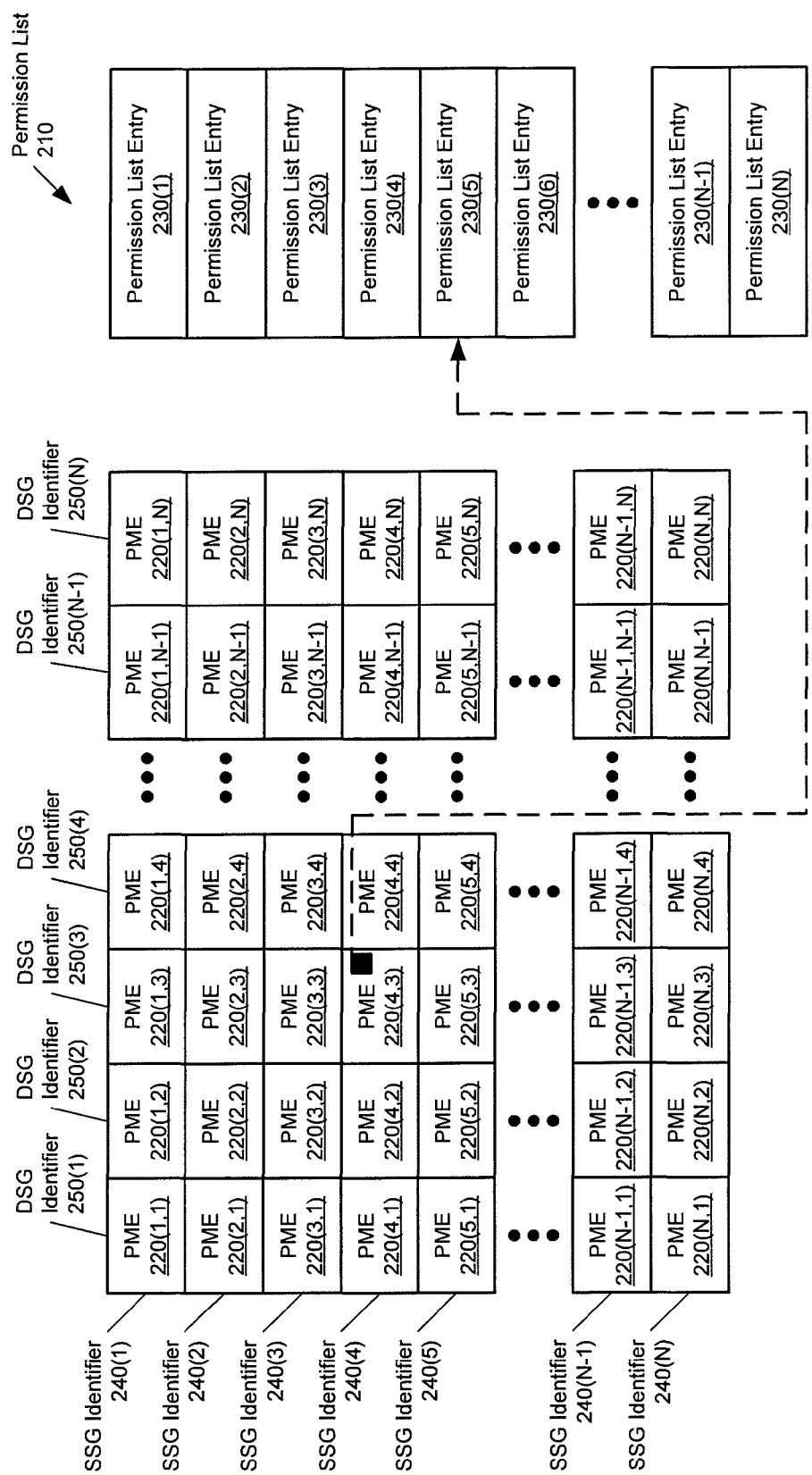
FIG. 2 is a block diagram illustrating a permissions matrix according to embodiments of the present invention.

FIG. 2 is a block diagram illustrating a permissions matrix 200 and a permission list 210, according to the present invention. Each of the entries in permissions matrix 200 (depicted as permissions matrix entries 220(1,1)-(N,N)) point to one of the entries in permission list 210 (depicted as permission list entries 230(1)-(N)). Each of permissions matrix entries (PME) 220(1,1)-(N,N) is indexed by one of a number of source security group identifiers 240(1)-(N) and one of a number of destination security group (DSG) identifiers 250(1)-(N). As will be apparent, each of source security group (SSG) identifiers 240(1)-(N) corresponds to a row in permissions matrix 200, while each of destination security group identifiers 250(1)-(N) corresponds to a column in permissions matrix 200. Each of permission list entries 230(1)-(N) provides a list of permissions as to the kinds of network traffic that are permitted between the source security group and destination security group. For example, given a source security group identifier of four (4) and a destination security group identifier of three (3), PME 220(4,3) is identified. PME 220(4,3) includes a pointer to permission list entry 230(5). Examples of permission lists and data structures therefor are given in patent application Ser. No. 10/659,614, entitled "Method and Apparatus for Providing Network Security Using Role-Based Access Control," as previously included by reference herein. The generation of user group information, RBACLs and data structures therefor are provided in patent application Ser. No. 10/970,532, filed Oct. 24, 2004, and entitled "Method And System For Generating User Group Identifiers," also having M. Smith as inventor, which is hereby incorporated by reference herein, in its entirety and for all purposes.

Thus, in a software based implementation, a tree-based, hash-based, or other such lookup structure can be employed, with the lookup being a match on the concatenation of the source and destination security groups. The result of the lookup is a pointer to a chain of ACLs. These ACLs are traversed in the order they are present in the chain. The ACLs are viewed logically as a single chained ACL.

In many ACL implementations, two approaches are typically employed. One approach is the network processor-based (software) model. This type of implementation is similar to the software implementation and may benefit from that approach. The other approach is using a CAM-based solution. The following section focuses on the CAM-based implementation.

An Example of a Hardware-Based Permissions Architecture Implemented Using Role-Based Access Control Lists A CAM-based implementation provides the advantage of a parallel lookup and the ability to mask fields. Parallel lookup provides high, predictable, and consistent performance. Unfortunately, the single lookup generally creates a significant amount of complexity for software programming of the device, because the typical implementation assumes sequential processing.

The permission matrix can also be implemented in an ASIC using on-chip memory, although it is preferable that the number of groups supported by a platform be relatively small (e.g., less than 256). In such a scenario, the output of the matrix provides a label (e.g., a flow label) which can then be used to perform a CAM lookup in a manner similar to that of traditional CAM-based ACL implementations. The likely case, however, is that the number of groups to be supported will be much larger, making an on-chip implementation infeasible. The permissions determination and permissions enforcement are thus typically implemented together within the CAM lookup itself. Using a single flow label for the RBACL lookup, the source and destination groups can be placed in the CAM flow specification in the place of the source and destination network addresses (e.g., IP addresses).

Figure 3:
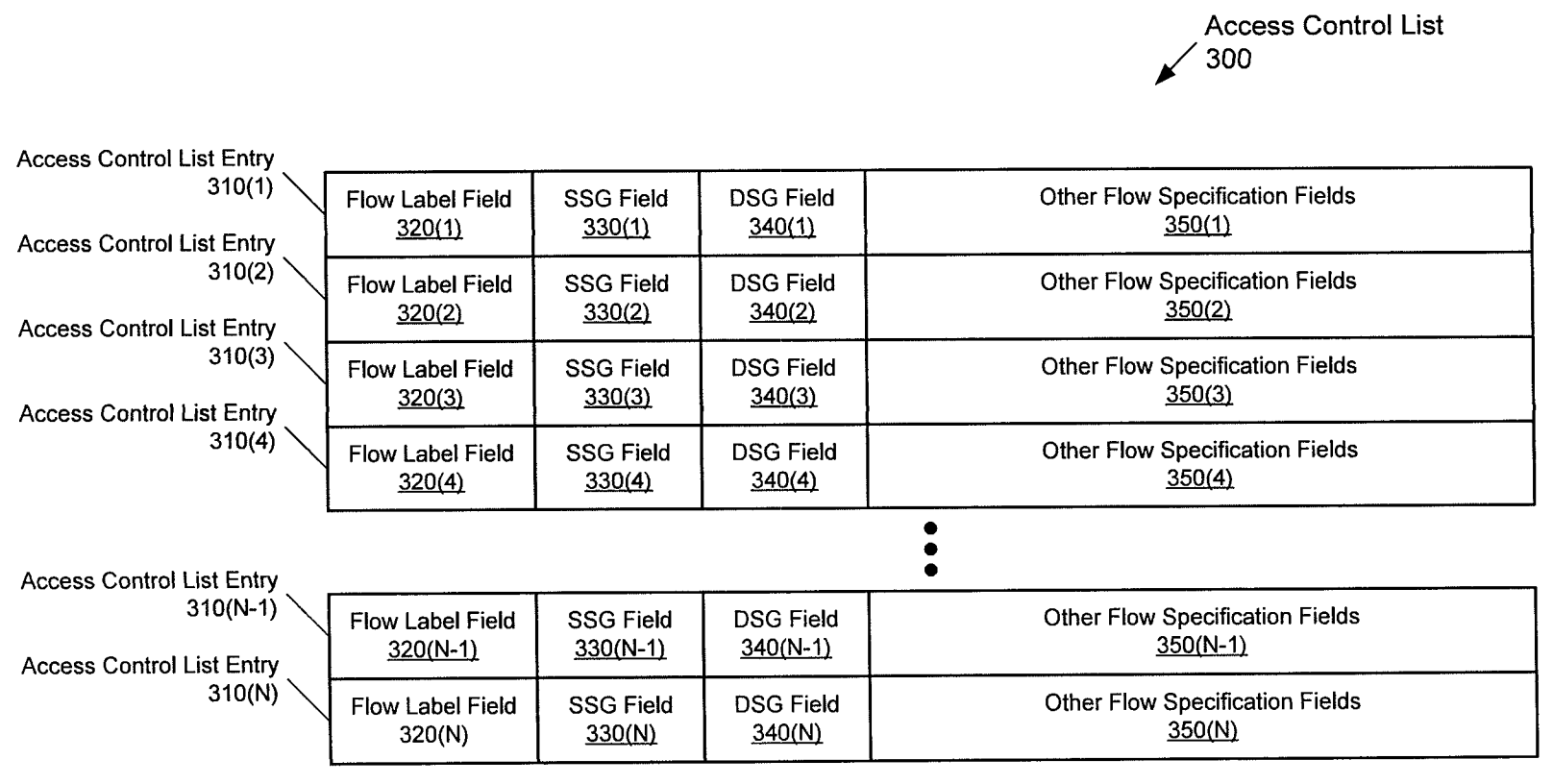

FIG. 3 is a block diagram illustrating an example of an access control list (ACL) according to the present invention, and depicted as access control list 300. Access control list 300 includes a number of entries (referred to as access control list entries or ACEs), which are depicted in FIG. 3 as access control list entries 310(1)-(N). Each of ACEs 310(1)-(N) include, for example, a flow label (depicted in FIG. 3 as flow label fields 320(1)-(N)), a source security group (SSG) identifier (depicted in FIG. 3 as SSG fields 330(1)-(N)), a destination security group (DSG) identifier (depicted in FIG. 3 as DSG fields 340(1)-(N)), and other flow specifications (depicted in FIG. 3 as other flow specification fields 350(1)-(N)). As is known, an ACL such as ACL 300 can be implemented using a content-addressable memory (CAM), and more specifically, a ternary CAM (TCAM), thereby providing for the fast and efficient look-up of information. An optional flow label (also referred to as an ACL label, maintained in the appropriate one of flow label fields 320(1)-(N)) is provided to distinguish RBACLs from traditional interface ACLs in the same device. A device employing only RBACLs would not need such a field.

An Example of a Network Employing RBACLs

Figure 4:
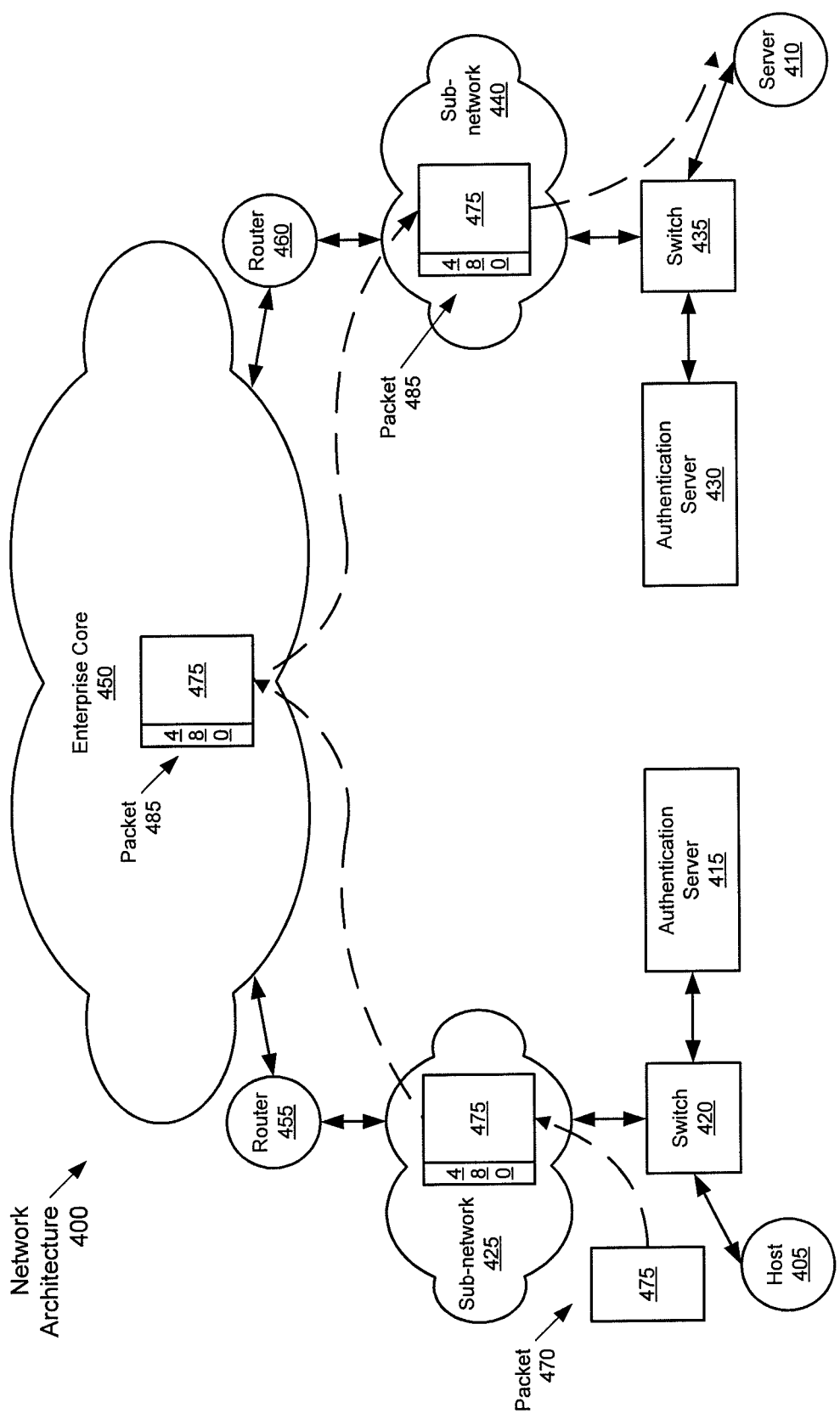
FIG. 4 is a block diagram illustrating an example of a packet's traversal through a network, and processing performed thereon according to embodiments of the present invention.

FIG. 4 is a block diagram illustrating an example of a network architecture 400 that includes a host 405 and a server 410. Host 405 is authenticated by an authentication server 415 via a switch 420, in the manner discussed earlier herein, as well as in patent application Ser. No. 10/659,614, entitled "Method and Apparatus for Providing Network Security Using Role-Based Access Control," as previously included by reference herein. Switch 420 also provides host 405 access to a sub-net 425. Server 410 is authenticated by an authentication server 430 via a switch 435, again in the manner discussed earlier herein, as well as in patent application Ser. No. 10/659,614, as previously included by reference herein. Switch 435 also provides server 410 access to (and from) a sub-net 440. Sub-nets 425 and 440 are communicatively coupled to one another via an enterprise core 450. Sub-net 425 accesses enterprise core 450 via a router 455, and similarly, sub-net 440 access enterprise core 450 via a router 460.

Also shown in FIG. 4 is a packet 470, having contents 475. Packet 470 is transmitted by host 405 to switch 420. Source security group information is added to packet 470 by switch 420 in the form of a source group tag (SGT) 480, based on information provided by authentication server 415 during the authentication process, in order to create a packet 485. As is depicted in FIG. 4, packet 485 includes both contents 475 and SGT 480. Packet 485 traverses sub-net 425 and arrives at router 455. Router 455 routes packet 485 across enterprise core 450 to router 460. Router 460 presents packet 485 to switch 435 (and thus, server 410) via sub-net 440. Switch 435 makes a determination as to whether to pass packet 485 to server 410 based, at least in part, on the DSG information provided to server 410 by authentication server 430. It will be appreciated that, alternatively, router 455 (or other routers within enterprise core 450) could also be tasked with, and make, this determination. Techniques for providing such functionality are described, for example, in patent application Ser. No. 10/989,535, filed Nov. 16, 2004, and entitled "Method And Apparatus For Best Effort Propagation Of Security Group Information," having M. Smith as inventor; and patent application Ser. No. 11/000,706, filed Dec. 1, 2004, and entitled "Method And Apparatus For Ingress Filtering Using Security Group Information," also having M. Smith as inventor. These applications are hereby incorporated by reference herein, in their entirety and for all purposes.

A specific example of the traversal of network architecture 400 by packet 470/packet 485 in the present example is now given. After authentication, host 405 can send packets (e.g., packet 470) on the network. Since RBACLs are being applied at network layer 3 in the present example, any packets the user attempts to send beyond his local sub-net (e.g., sub-net 425) will be subject to RBACL inspection. As will be appreciated, switches 420 and 435 can also employ RBACLs in the layer 2 domain (e.g., within sub-nets 425 and 440, respectively).

If packet 485 is the first packet to be sent from host 405 to server 410, an ARP process will be triggered for the destination. The sending of packet 485 begins with the SSG (in this case, with a value of 5) being taken from SGT 480. A FIB lookup in router 455 for a packet has the destination of packet 485 indicates the next hop router to which the packet should be forwarded. This Next Hop Information could be, for example, either the MAC rewrite information for router 460, or that for a router between router 455 and router 460. It will be noted that, in this example, the prefix information is contained in a CAM, while the security group and next hop information are contained in a standard memory (e.g., SRAM). The lookup is performed by using the prefix to determine which entry in memory to inspect.

When packet 475 (later packet 485) is sent from host 405, packet 475 is untagged, as noted. In this example, upon entering switch 420, packet 475 is tagged with SGT 480 (which indicates a security group of 5). This security group is retrieved from the layer 2 table in the ingress switch (switch 420) in the manner discussed previously. This packet (which is, now including SGT 480, referred to as packet 485) is then sent through network architecture 400 via the routing and switching provided thereby.

At the egress router (router 460), FIB lookup is performed. If the FIB lookup hits a locally-attached sub-net, the glean adjacency causes an ARP request to be generated for the desired server (e.g., server 410). The ARP request is sent from router 460 to server 410. The ARP response is then sent from server 410. The ingress network device operating at Layer 2 (L2) of the OSI protocol stack (switch 440) inserts the SSG for server 410 (or, as used by the switches/routers of network architecture 400 (e.g., host 405) as the DSG for packets sent to server 410; which is set to a security group of 6) into the ARP response (in the L2 header). Router 460 receives the ARP response and populates the FIB with the resolved host prefix, the rewrite information containing the MAC address of the host, and the destination security group (6) from the ARP response.

In the case where packet 485 is a subsequent packet from host 405 to server 410, the tables in question should already be populated. Once the FIB of router 460 contains the fully resolved host prefix, the next packet to server 410 will be subject to access control. (In the embodiment of the present invention in this example, the first packet that triggered the ARP resolution is dropped.) When the subsequent packet arrives from host 405 arrives at router 460, router 460 already possesses the information relating to the pertinent source and destination groups. The SSG (5) is extracted from the subsequent packet's SGT and the DSG (6) is discovered by the FIB lookup.

At this point, an ACL lookup can be performed. Assuming a CAM-based implementation is employed, the lookup key into the CAM contains the packet information as well as the source and destination security groups (5 and 6). In this example, the only allowed permission between the 2 groups is web traffic (tcp port 80). As will be appreciated, it is desirable to perform this access control processing earlier in the route of a packet being conveyed through the network.

Since, in this example, the subsequent packet is indeed web traffic (destined for TCP port 80), the appropriate CAM entry is hit and transmission of the packet to sub-net 440 (and so, on to server 410 via switch 435) is permitted. However, to illustrate further, if the subsequent packet had been a Telnet packet (destined for TCP port 23), the packet would hit the ANY-ANY entry in the CAM, which would not permit such transmission (effectively implementing the implicit deny present in software ACLs). A more generalized discussion of the operations described in the preceding passages is now presented in connection with FIGS. 5 and 6.

An Example of the Operation of a Network Employing RBACLs

Figure 5:
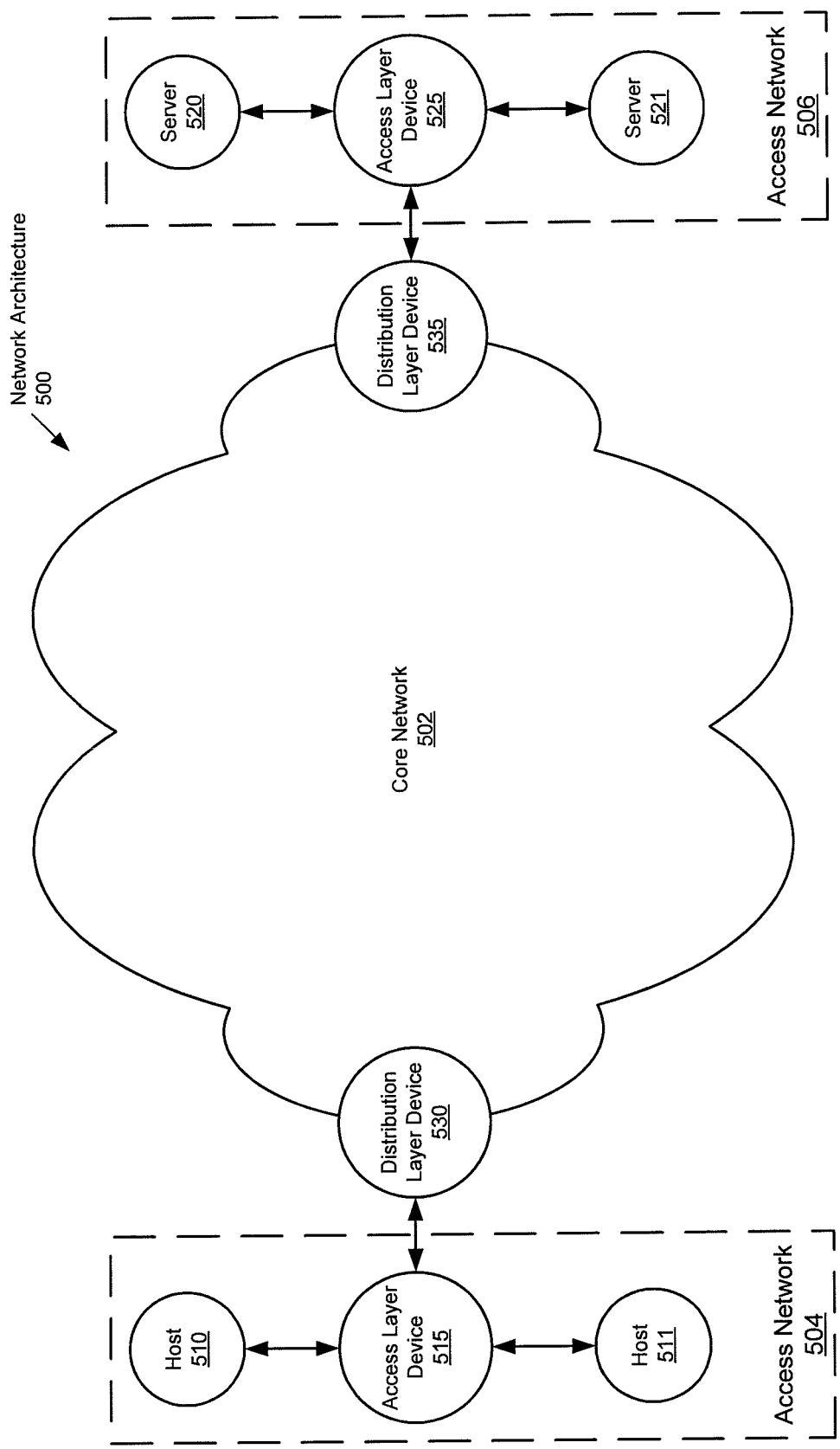
FIG. 5 is a diagram illustrating an example of a network architecture, including hosts and servers, in which the present invention can be practiced.

FIG. 5 is a block diagram illustrating an example of a network architecture 500, including hosts and servers, in which the present invention can be practiced. As can be seen, network architecture 500 includes a core network 502, which couples to access networks 504 and 506 to one another. Access network 504 includes hosts 510 and 511, which are coupled to core network 502 via an access layer device 515. Similarly, access network 506 includes servers 520 and 521, which are coupled to core network 502 via a access layer device 525. Hosts 510 and 511 thus communicate with servers 520 and 521 via core network 502. Core network 502 includes a number of network devices, but for the sake of simplicity, only the ingress and egress network devices are shown (depicted in FIG. 5 as distribution layer devices 530 and 535). As will be appreciated, although core network 502 is depicted as including only distribution layer devices 530 and 535, core network 502 can include any variety of other kinds of network devices, depending on the network protocols and architectures supported thereby. Such an example is given in connection with the network architecture depicted in FIG. 6.

Figure 6:
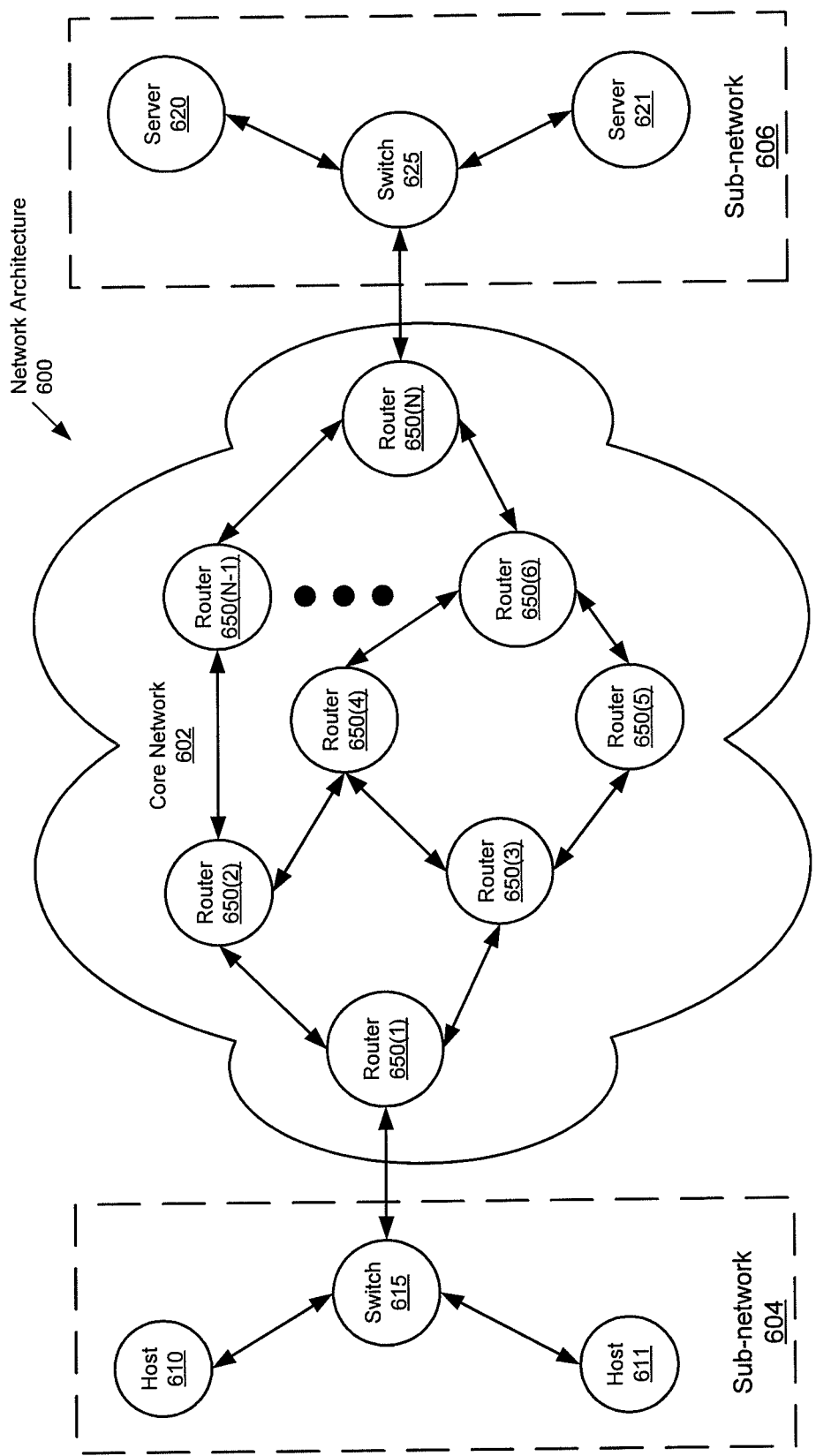
FIG. 6 is a diagram illustrating an example of a network architecture, including hosts and servers, in which the present invention can be practiced.

FIG. 6 is a block diagram illustrating an example of a network architecture 600, including hosts and servers, in which the present invention can be practiced. Network architecture 600 illustrates an example of network architecture 500 with greater specificity. As can be seen, network architecture 600 includes an enterprise core network 602, which couples to sub-networks 604 and 606 to one another. Sub-network 604 includes hosts 610 and 611, which are coupled to enterprise core network 602 via a switch 615. Similarly, sub-network 606 includes servers 620 and 621, which are coupled to enterprise core network 602 via a switch 625. Hosts 610 and 611 thus communicate with servers 620 and 621 via enterprise core network 602. Enterprise core network 602 includes a number of network devices, but for the sake of simplicity, is shown as including a number of routers (depicted in FIG. 6 as routers 650(1)-(N)), variously interconnected to one another. As will be appreciated, although enterprise core network 602 is depicted as including only routers 650(1)-(N), enterprise core network 602 can include a variety of other kinds of network devices, depending on the network protocols and architectures supported thereby.

In the context of network architecture 600, as a packet is sourced (e.g., from host 610, via switch 615, to router 650(1)) and traverses enterprise core 602, security group information (e.g., a source group tag) is carried along with the other information in the packet. At the egress edge of enterprise core 602 (e.g., router 650(N)), the destination group of the packet's destination (e.g., server 621) is determined. For example, the destination group can be derived from the forwarding information base (FIB) of router 650(N) via the fully resolved host prefix. The host prefix is resolved through the address resolution protocol (ARP). The ARP response is tagged with the destination's security group information when the response is sourced onto the network. The FIB result is populated with the destination group in addition to the rewrite information. Once the source and destination groups have been determined, the permissions (the relevant ACL entry) can be determined by the egress node (e.g., router 650(N)).

However, this determination can be made closer to the ingress node, which may be desirable for a number of reasons. To propagate the security group information into the network, the present invention provides mechanisms to propagate group membership information along a packet's route, from the packet's egress node, toward the packet's ingress node. For example, Layer 3 (L3) routing protocols (of the OSI protocol stack) can be modified to allow for the propagation of security group information (e.g., a security group identifier (SGI) such as a security group tag (SGT)), along with route update information, as part of the operation of the L3 protocol.

As noted earlier, however, it may be desirable to provide support for making this decision at a point in the given network closer to the ingress node, rather than at the egress node. Examples of such approaches can be found in patent application Ser. No. 10/989,535, entitled "Method And Apparatus For Best Effort Propagation Of Security Group Information"; and patent application Ser. No. 11/000,706, entitled "Method And Apparatus For Ingress Filtering Using Security Group Information," as previously included by reference herein. However, wherever the filtering is performed, the foregoing figures and their descriptions assume that the network devices, in the path of a given packet, are capable of performing the necessary packet processing (e.g., the processing of security group information).

An Example Implementation of Security Groups in Network Devices without Native Support Therefor As noted earlier, while the techniques mentioned above provide a number of desirable advantages, such an approach assumes that each of the appropriate network devices along a packet's path through a network is capable of performing its respective access control duties with regard to packets traversing the network. While this approach is conceptually simple, not all network devices will offer the capabilities necessary to support the use of security groups, and, in particular, the generation, dissemination and processing of SG information (e.g., security group tags (SGTs)). Such can be the case, for example, in the situation in which support for security groups is introduced in a network in stages. As the network is migrated from non-security-group-capable network devices to security-group-capable network devices, network devices in the network are replaced or upgraded in a piecemeal manner. This leaves the network with some number of security-group-capable and some number of non-security-group-capable network devices at any given time. Thus, there exists the need for a mechanism to allow non-security-group-capable network devices to be configured to provide features that support the use of security groups, and in particular, security group tags. More broadly, such a need exists in the context of allowing certain network devices that are incapable of performing processing tasks typically performed thereby, to off-load some or all of such tasks to the network devices to which such network devices are coupled.

In order to provide this support, a method and system of the present invention can be employed to propagate the information needed to perform access control processing from one network device to another. This allows the network device receiving the information to perform the access control processing that would be performed by the network device sending the information, were that network device capable of performing the requisite processing. In particular, such a situation can arise in the case in which a non-security-group-capable (non-SG-capable, as noted) network device in a sub-network is coupled to a security-group-capable (SG-capable, as also noted) network device that is part of a core network (e.g., a non-SG-capable switch in a sub-network coupled to a SG-capable router in a core network). In one embodiment of the present invention, this approach propagates security group information from a non-SG-capable node in a sub-network to a SG-capable node in a core network, to which the non-SG-capable node is coupled. This allows the requisite access control processing to occur, albeit on the SG-capable node of the a core network, rather than the non-SG-capable node of the sub-network.

This approach is advantageous for a number of reasons. Among these advantages is the ability to extend support for security groups at a measured pace, rather than requiring the revamping of an entire network, and so avoiding an intensive outlay of resources (logistical, financial and so on). This approach is also advantageous because any modifications that might be needed in the non-SG-capable node can be made in software, which provides for easy distribution/installation and, again, obviates the need to update or replace any hardware on the non-SG-capable node. On the SG-capable node, there may be no need to update hardware, as this device may already be able to handle security group information, and thus, a software upgrade may suffice to support the mechanisms described herein. In any case, the number of network devices that must be updated in such a situation is drastically reduced, typically. This is because, for example, the number of network devices residing in an enterprise's sub-networks (e.g., switches) greatly outnumber the number of network devices that reside in an enterprise's core network (e.g., routers).

It will be appreciated that the processes described in preceding sections of the present application can be used in the context of the present invention, including assigning security groups, acquiring security group information, taking certain actions with regard to conveying packets across the network, and the like. In particular, as will be noted with regard to the figures described subsequently, the primary differences become evident at the point in the network at which, for example, a packet travels between a sub-network and a core network. As will be appreciated, while an implementation of the present invention can also comprehend conveying security group information between other network devices, the examples presented herein are explained in terms of the aforementioned scenario, because such a scenario is expected to be a common situation encountered when upgrading a network to support security groups and the conveyance of security group information. However, it will also be appreciated that, depending on the network devices' architectures, it may be desirable to support interactions and processing such as that described herein, between different sets of nodes, at other points in the network. In fact, the present invention can be implemented at any one of a number of points in a network, as appropriate to the network's architecture, security management needs, migration strategy and other such factors.

In certain embodiments of the present invention, the first packet traversing the network from a source to a destination is used to determine security group information. For this first packet, this portion of the process is similar to that of the process described in earlier sections of this disclosure. Once this first packet reaches its egress node, the packet's receipt triggers a process by which information regarding the destination's security group and address is determined. For example, this information can be obtained from the destination, from network nodes within the sub-network to which the network node is attached, from information stored at the network node or the like. Once this information has been determined, the relationship between the destination's security group and address can be made known to the ingress node. This allows access control processing, which is performed at the egress node using the process described previously, to be performed at the packet's ingress node. Access control processing can then be performed on subsequent packets sent from the given host to the server in question at the ingress node, rather than waiting until such packets reach the egress node. Alternatively, a "best effort" technique can be employed, in which security group processing is performed on a packet as the packet traverses the network, from the ingress node to the egress node, as soon as such processing can be performed.

As noted earlier, this approach is particularly advantageous in the situation in which the access control processing results in the denial of packets destined for a given destination, as the sooner a packet is denied, the less unnecessary traffic the network is forced to carry. Moreover, such an approach is able to more quickly prevent the spread of malicious packets. A network employing such an approach is thus able to enjoy the aforementioned benefits provided by the present invention. Such a process is also typically employed in the situation in which a packet is to be permitted, as a permitted packet will simply be conveyed to the egress node regardless of the point at which access control processing is performed on the packet. Such is typically the case because distinguishing between permits and denies involves unnecessarily complicates the processing of packets, and provides little benefit (given that permitted packets will be conveyed to the egress node in either case). Thus, early access control processing in the case of permitted packets may not offer quite the same advantages as are provided in the case of denied packets. However, while the efficiency of having a single point for access control processing for both denied and permitted packets may be desired, conveying information regarding denials and permissions to the ingress node may dictate the use of different mechanisms. As will also be appreciated, however, the implementations presented herein are but examples of the present invention, and other embodiments will be apparent to one of skill in the art, in light of the disclosure provided herein. Such alternatives are intended to come within the scope of the claims appended hereto.

In one embodiment, the preceding objectives are met through the use of a protocol that supports the exchange of information regarding security groups. Security group information is made available to the non-security-group-capable node via the authentication process (e.g., by way of the provision of a security group identifier), which can be supplied by an authentication server, for example. Upon authentication (e.g., of a host or server in a sub-network), this security group information is made available to the security-group-capable node that couples the sub-network to a core network by the non-security-group-capable node in the sub-network. In this manner, this security group information is passed to a packet's ingress node (the security-group-capable node). Propagating this information to the packet's ingress node provides the ingress node with the information needed to perform access control processing on such packets that would otherwise be performed by the non-security-group-capable node in the sub-network.

In one embodiment, an architecture that supports security groups includes three primary components. The first component of such an architecture is an authentication infrastructure that enforces authentication of network devices within a security domain. The second component is the securing of the packets transported within a security domain (e.g., by way of cryptographic methods). The third component is providing a pervasive and scalable method of access control within a security domain.

Access control can be provided, for example, using a role-based access control list (RBACL, as noted). As noted, an example of RBACLs, their definition and their use, as well as other aspects of this technology, is provided in patent application Ser. No. 10/659,614, entitled "Method and Apparatus for Providing Network Security Using Role-Based Access Control," as previously included by reference herein. From a general perspective, packets are tagged at some point in their trek across a security group enabled network (e.g., the ingress point of the core network) with a group identifier determined by the identity of the packet's source, or in the case of the present invention, the security-group-capable network device having received the requisite information. The tag (referred to herein as a Security Group Tag or SGT, as noted earlier) is retained as the packet traverses the network. At some point in the network (e.g., at the egress point of the network), the security group of the packet destination (which can also be represented by an SGT) is known. At this point, access control can be enforced. For further understanding on RBACLs and an SGTs, reference should be made to patent application Ser. No. 10/659,614, as noted.

In order to insert an SGT into a packet, propagate a packet containing an SGT, remove an SGT from the packet and process the packet using the SGT, at least some of the network hardware from the ingress node to the egress node, as well as the network hardware of the network devices in the sub-networks coupled thereto, will typically need to be updated in some manner. This introduces a relatively significant obstacle to the migration of a non-security-group-capable network to one that is security-group-capable. This, in turn, can impact the adoption of security group technology within the enterprise. The present invention provides a solution that addresses this issue, as noted.

This is of particular importance in the case of the access layer switch, which is typically one of the most ubiquitous elements of today's networks. As a result, upgrading all such access layer switches in a network at once can be, and often is, cost prohibitive, both in terms of capital expenditure as well as operational expenditure. It is therefore likely most desirable to permit the existence of legacy access layer switches in an environment in which network elements are to be updated to support security groups. In today's networks, the Open Systems Interconnect (OSI) network protocol stack has found wide acceptance, and in such networks, authentication typically occurs at the ingress network device. In this case, the authentication must occur either in the access layer switch or in the adjacent distribution layer switch.

Unfortunately, performing authentication in the distribution layer switch on behalf of the access layer switch is considerably less secure and less scalable, but most importantly requires a solution other than authentication based on 802.1x. An alternative solution would require the distribution layer switch to become considerably more complicated as well as require additional software functionality on the end system (i.e. IP phone or user's PC). Luckily, authentication is strictly a software function. The method defined to allow legacy access layer switches to exist in a RBACL-capable network requires at least some upgrading of the access layer switches' software, that, in so doing, allows the access layer switches to remain legacy hardware. By allowing legacy hardware in the access layer, the present invention addresses what is typically the largest number of network devices within an enterprise's network, thus reducing the logistical implications of such an upgrade path.

The upgraded software on the access layer switch contains software to allow authentication of end systems as well as an additional protocol. While this protocol is referred to herein as an SGT Exchange Protocol (SXP), one of skill in the art will realize, in light of the present disclosure, that such a protocol is simply concerned with off-loading the processing of network security information carried by packet from one network device to another, in the broadest sense.

In one embodiment, SXP is a control protocol that runs between an access layer switch and a distribution layer switch. The distribution layer switch will, as noted, have SG-capable hardware, and so be capable of appropriately processing packets containing security group information such as an SGT. Authentication is performed on the access layer switch in the same manner as a access switch with SG-capable hardware. Since the access layer switch is not SG-capable, no data traffic will be encrypted or cryptographically authenticated when passing through the access layer switch. More importantly, in the present context, the hardware of the access layer switch is unable to insert security group information (e.g., an SGT) into the packet. In such an embodiment, SXP is used to pass the L2 and L3 addresses of the authenticated device, and the SGT passed as part of the authentication, to the distribution layer switch. Such functionality can, with relative ease, be implemented and distributed in software, making the processing of upgrading access layer switches to SXP capability logistically tenable. The distribution layer switch is then tasked with inserting the SGT into the packet on behalf of the access layer switch. Again, adding SXP functionality is a relatively straightforward process, and even if distribution layer switch hardware needs to be upgraded to support security group information processing, the number of affected network devices is a great deal smaller than would otherwise be the case. At the point at which RBACL processing is performed (e.g., on the egress side), the access layer switch will typically be a network device operating at L2 of the OSI protocol stack. The enforcement of the RBACL will then take place at the egress interface (at L3) on the distribution layer switch, in the manner discuss previously. Alternatively, such processing can be performed sooner in the packet's traversal of the core network, as also noted earlier.

Figure 7:
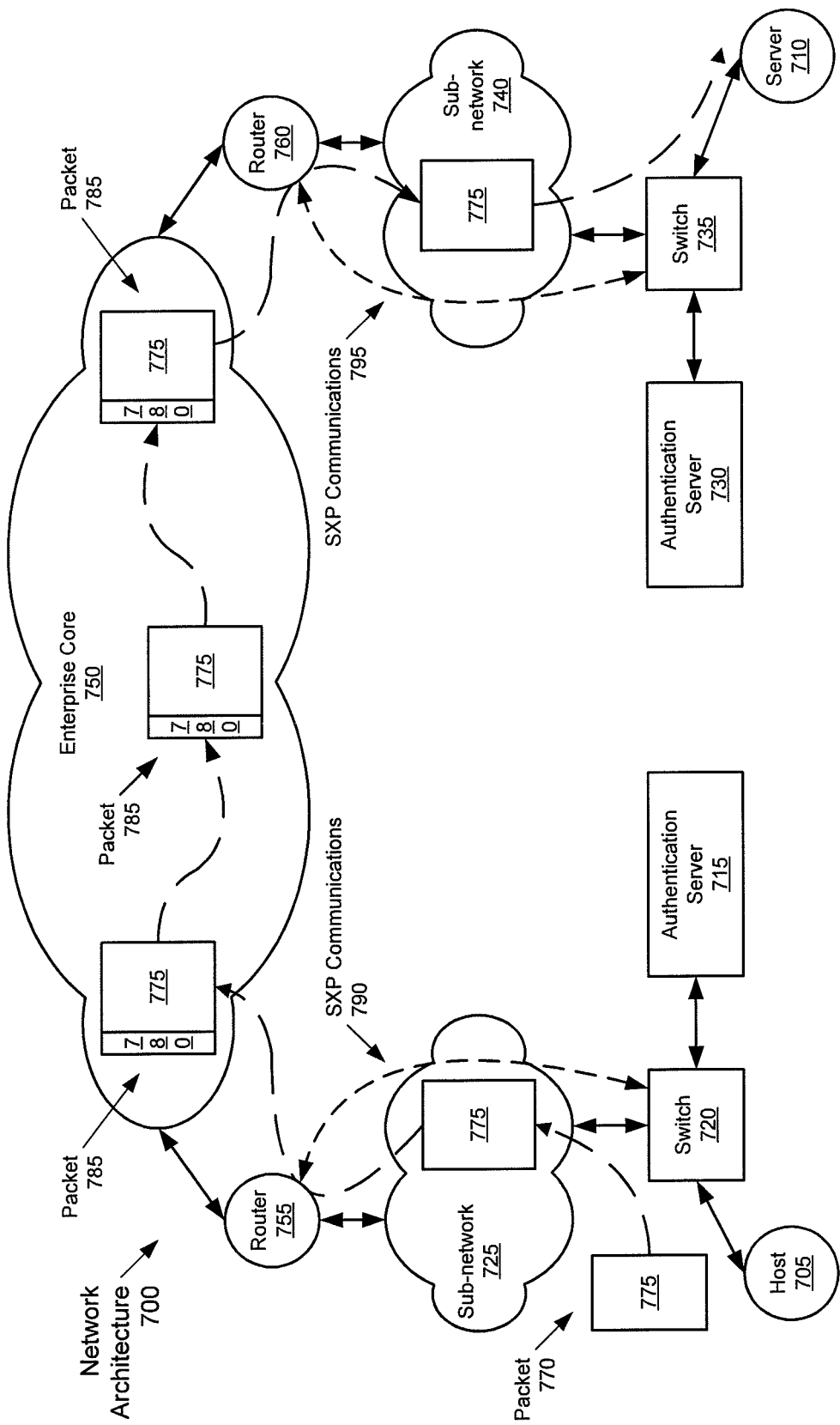
FIG. 7 is a block diagram illustrating an example of a packet's traversal through a network, and processing performed thereon according to embodiments of the present invention.

FIG. 7 is a block diagram illustrating an example of the operation of an embodiment of the present invention in a network architecture 700 (certain network devices of which are non-SG-capable) that includes a host 705 and a server 710, in the manner of network architecture 400 of FIG. 4 (all the network devices of which are SG-capable). As will be appreciated, the operation of network architecture 700 thus illustrates the functionality provided by the present invention, as represented by the packets depicted in FIG. 7. Host 705 is authenticated by an authentication server 715 via a switch 720. While this authentication is performed in a manner similar to that discussed earlier herein, certain important differences exist, as will be discussed subsequently. Switch 720 also provides host 705 with access to a sub-net 725. Server 710 is authenticated by an authentication server 730 via a switch 735, again in a manner similar to that discussed earlier herein, with the differences therein discussed subsequently. Switch 735 also provides server 710 access to a sub-net 740. Sub-nets 725 and 740 are communicatively coupled to one another via an enterprise core 750. Sub-net 725 accesses enterprise core 750 via a router 755, and similarly, sub-net 740 access enterprise core 750 via a router 760.

Also shown in FIG. 7 is a packet 770, having contents 775. Packet 770 is transmitted by host 705 to switch 720. Unlike switch 420 of network architecture 400, switch 720 is not configured to process SG information. However, using an embodiment of the present invention (e.g., SXP-capable software), switch 420 is able to provide SG-related information to router 755. This SG-related information is sufficient to allow router 755 to perform the requisite processing of the SG information and packet 770, on behalf of switch 420.

Packet 770 then traverses sub-net 725, subsequently arriving at router 755. Source security group information is added to packet 770 by router 755 (on behalf of switch 720) in the form of a source group tag (SGT) 780, based on information provided to switch 720 by authentication server 715 during the authentication process, in order to create a packet 785. As is depicted in FIG. 7, packet 785 includes both contents 775 and SGT 780. The interaction between switch 720 and router 755 that support this functionality are depicted in FIG. 7 as SXP communications 790, and are described in greater detail subsequently.

Router 755 then routes packet 785 across enterprise core 750 (depicted at various points within enterprise core 750), to router 760. Based on information received from switch 735 via SXP communications 795, router 760 makes a determination as to whether to pass packet 785 to switch 735 (and ultimately, server 710) based, at least in part, on the DSG information provided to switch 735 (and subsequently router 760) by authentication server 730. If router 760 determines that packet 785 should be passed to server 710, router 760 strips off SGT 780 and presents packet 770 to switch 735 (and thus, server 710) via sub-net 740. It should be noted that, alternatively, router 755 (or other routers within enterprise core 750 (e.g., at some point along the path of packet 785 depicted in FIG. 7)) could also be tasked with, and make, this determination, in the manner noted earlier herein.

An Example Implementation of An SGT Exchange Protocol

As noted earlier, not all network devices will offer the capabilities necessary to support the use of security groups, and, in particular, the generation, dissemination and processing of SG information (e.g., SGTs). In order to provide this support, embodiments of the present invention can be employed to propagate the information needed to perform access control processing from one network device to another, allowing the network device receiving this information to perform the requisite processing on behalf of the network device providing the information.

Thus, the network device receiving the information performs the access control processing that would be performed by the network device sending the information, were that network device capable of performing the requisite processing. In particular, such a situation can arise in the case in which a non-security-group-capable (non-SG-capable, as noted) network device in a sub-network is coupled to a security-group-capable (SG-capable, as also noted) network device that is part of a core network (e.g., a non-SG-capable switch in a sub-network coupled to a SG-capable router in a core network). In one embodiment of the present invention, this approach propagates security group information from a non-SG-capable node in a sub-network to a SG-capable node in a core network, to which the non-SG-capable node is coupled. This allows the requisite access control processing to occur, albeit on the SG-capable node of the core network, rather than the non-SG-capable node of the sub-network. In one implementation of such an approach, an SGT Exchange Protocol (SXP) is implemented to provide the requisite communications between SG-capable network devices and non-SG-capable network devices.

In one embodiment, SXP is enabled on an access layer switch's uplink interface and on the distribution layer switch's interface coupled to the access layer switch (the uplink being the communications link coupling the access layer switch to the distribution layer switch). Authentication of the access layer switch with the distribution layer switch occurs normally. As part of the authentication, a capability is exchanged to inform both the access and distribution layer switches that each are capable of exchanging the requisite SG-related information using SXP. In one embodiment, it is at this point that the access layer receives the requisite SGT in software from its associated AAA.

In one embodiment, initial negotiations between the access layer switch and the distribution layer switch are performed using SXP (as opposed to being hard-coded or employing some other approach), among other transactions that can be supported by a protocol such as SXP. In certain embodiments supporting such functionality, SXP is implemented as a link layer protocol, with SXP messages being sent using unicast MAC addresses between the access layer and the distribution layer switches in question, for example. The MAC addresses can be, for example, the source MAC addresses used in the 802.1x authentication exchange. While any layer appropriate to the given implementation can be used, the foregoing is a natural solution. This also avoids allocating an external Ethertype, IP protocol version, or port number (of Layer 4 (L4) of the OSI protocol stack), although, as noted, such allocations can be made, should such an implementation be deemed desirable, for whatever reasons. For SXP, the majority of SXP protocol data units (PDUs) are initiated by the access layer switch, as the preponderance of the "intelligence" (processing) is performed by the access layer switch. This is preferable, though not mandatory, as such an approach enhances the scalability of the solution, as opposed to demanding more "intelligence" in the distribution layer switch. The access layer switch tracks the identity of the distribution layer switch coupled to each of the access layer switch's uplinks. Preferably, the access layer switch transmits SXP on only one of the uplinks, if multiple uplinks are coupled to the same distribution layer switch. SXP is thus used to push MAC address-, VLAN identifier- and IP address-to-SGT assignments upstream. Simple aging can then be used on an upstream proxy to remove entries upon connection removal.

Advantageously, a protocol according to the present invention (e.g., SXP) is typically a low-bandwidth protocol, in relative terms, which operates at the frequency of device authentications. Since the bandwidth requirements are minimal, and are in addition to messages already sent for authentication, a protocol such as SXP is not viewed as being processor intensive. Moreover, the additional memory requirements for SXP are minimal, again, in relative terms. Beyond the storage of any additional configuration information, one implementations of SXP requires the state of the distribution layer switch peer to be stored for each uplink and a bit per authentication to indicate that it has been successfully sent to the distribution layer switch peer. As a result, SXP is a minor addition to the memory requirements already imposed by CPS.

Operationally, the example implementation of SXP makes use of the state machines of the authentication protocol employed (e.g., 802.1x). When a network device is authenticated, SXP sends the appropriate SGT and the appropriate network device addresses to the distribution layer switch (e.g., routers 755 and 760). An example of a packet format that can be employed in implementing a protocol according to the present invention is shown in Table 1, below.

TABLE 1

Packet format used in an example SXP implementation.

| # octets | Packet Format |
|---|---|
| 6 | Ethernet DA (Unicast MAC address of Distribution or Access Switch CPU) |
| 6 | Ethernet SA (Unicast MAC address of Distribution or Access Switch CPU) |
| 4 | 802.1Q tag (optional) (VLAN of the interface, 1 or configured if trunk) |
| 2 | Ethertype == CPS |
| 16 | ESP (ESP) |
| 4 | 33 00 00 0C (LLC encoded with specific OUI) |
| 2 | SGT Proxy Assignment Protocol (assigned HDLC protocol type value) |
| 1 | SGT Proxy Assignment Protocol Version |
| 1 | Number of SGT Proxy Assignment Protocol TLVs |
| 1 | Sequence Number |
| 1 | Acknowledgement Number |
| Variable | SGT Proxy Assignment Protocol TLVs |
| Variable | Payload |
| Variable | Pad |
| 1 | Pad Length |
| 1 | Reserved and set to zero |
| 12 | Authentication Tag (AT) |
| 4 | CRC |

TABLE 1-continued

Packet format used in an example SXP implementation.

| # octets | |
|---|---|
| | ESP Header |
| 4 | Security Parameter Index (SPI) |
| 4 | Low order 32 bits of sequence number |
| 2 | High order 16 bits of sequence number |
| 2 | Reserved and set to 0 |
| 2 | Source Group Tag (Set to the SGT of the sending CPU) |
| 2 | Original Ethertype or length (set to AAAA) |

It will be noted that although Table 1 shows an Ethernet SXP Protocol (ESP) header, such a header is optional (though preferable for reasons of security). Such a header is applied as part of processing by the protocol stack and need not be known to the SXP protocol. This is similar to the manner in which other control packets can be secured in implementations of the present invention. In the example presented, the SXP Version field is filled with the value representing the current version number of the protocol, typically as defined in the version of the protocol's specification.

Assignment can be performed in the following manner. First, the proxy assigns a given SGT based on access layer connectivity, for example. In certain embodiments, this includes both L2 and L3 connectivity. In the case of L2 connectivity—source MAC, VLAN or source IP address, while in the case of L3 connectivity, only the source IP address is employed. The proxy assumes port-to-address binding is performed in the access layer, and so the port need not be used in assigning SGT at the distribution layer. SXP allows multiple connections to the same access layer switch without complicated hardware.

As will be described in greater detail below, SXP can be implemented using a simple Type/Length/Value (TLV)-based protocol, for example. The following TLVs provide examples of the TLVs that can be defined when implementing such a protocol, in order to provide support for such a protocol's functionality.

Install TLV

The Install TLV is the main staple of the SXP protocol. The Install TLV, implemented in this embodiment as Type 0x0001, is used in the situation in which the 802.1x state machine of the access layer network device has determined that the network device in question has been authenticated and an SGT has been assigned. The value portion of the Install TLV is shown in Table 2, below.

TABLE 2

An example of an SXP Install TLV.

| Field | Sub Field | Size (in Bits) |
|---|---|---|
| Number of Assignments Contained | | 8 |
| Assignment | MAC, VLAN | 60 |
| | L2 or L3 connected | 1 |
| | Reserved | 3 |
| | IP address | 32 |
| | SGT | 16 |

The Install TLV can contain multiple Assignments. Multiple assignments within a single protocol data unit (PDU) is possible due to the blocking reliability aspect of SXP, as noted subsequently. In the embodiment presented here, each assignment contains the MAC, VLAN address and IP address of the authenticated device. The "L2 or L3 connected" bit is set by the access layer network device. A value of 0 indicates L2 connected and a value of 1 indicates L3 connected. This bit is set to indicate L2 connected when traffic from the authenticated device will be bridged to reach the uplink interface (of the distribution layer network device). This can be determined, for example, by checking if the ingress VLAN on which the device was authenticated is the same as that of the uplink interface, or in the case of an uplink trunk, if the uplink carries the VLAN. This bit indicates to the distribution layer network device whether to install the MAC, VLAN or to install the IP address to assign the SGT. The distribution layer network device typically implements the assignment by installing an entry in an ingress access control list (ACL) on the uplink interface that will assign an SGT to any packet sourced from the authenticated device.

In this example, the Install TLV is used for both installing new authentication information and updating authentication information previously sent to the upstream switch (the distribution layer network device), by replacement thereof. Moreover, the functionality of the Install TLV and Delete TLV can be extended to include additional information such as OSI L4 ports which may be used in the case of SGT tagging based on application, as well as to provide other information, and so support additional functionality.

Delete TLV

The Delete TLV is the counterpart of the Install TLV. The Delete TLV, implemented in this embodiment as Type 0x0002, is sent when the 802.1x authentication state machine on the access layer network device has determined that the authentication is no longer valid.

TABLE 3

An example of an SXP Delete TLV.

| Field | Sub Field | Size (in Bits) |
|---|---|---|
| Number of Assignments Contained | | 8 |
| Assignment | MAC, VLAN | 60 |
| | L2 or L3 connected | 1 |
| | Reserved | 3 |
| | IP address | 32 |
| | IP address | 32 |

In the example presented herein, the fields are the same as those of the Install TLV. The "L2 or L3 connected" bit is passed again so that the distribution network device can easily determine whether the distribution network device installed the entry using the MAC, VLAN or the IP address.

Delete all TLV

As its title implies, the Delete All TLV, implemented in this embodiment as Type 0x0003, is available in case the access layer network device is to have the upstream network device (e.g., distribution layer network device) delete all of the authentication entries which the upstream network device had previously installed. This may result from a number of situations, such as the access layer network device experiencing a failure that leaves the access layer network device unable to determine which entries were previously installed in the upstream network device. Unlike the Delete TLV, there need not be a value associated with the Delete All TLV. In response, the upstream network device can simply remove all authentication entries installed by the particular access layer network device that sent the Delete All TLV.

SXP Error TLV

The usage of the Error TLV, implemented in this embodiment as Type 0x0004, is discussed in the subsequent section on failure scenarios.

TABLE 4

An example of an SXP Delete TLV.

| Field | Sub Field | Size (in Bits) |
|---|---|---|
| Error Code | | 32 |

Retransmit Database TLV

The usage of the Retransmit Database TLV is described in the subsequent section dealing with high-availability considerations. There is no value needed for this TLV.

SXP Reliable Transmission

Since SXP typically operates over a single link, SXP is expected to be quite reliable. As a result, only the simplest of reliability need be built into the protocol, although, as will be apparent to one of skill in the art in light of the present disclosure, a more robust reliability paradigm can certainly be implemented. For example, assuming that only a simple reliability paradigm is deemed warranted, a procedure can be employed in which a sequence number and acknowledge number are passed in each PDU. The transmission from the access layer switch to the distribution layer switch is a blocking transmission with a simple retransmission after a configurable timeout period. Using such an approach, the receiver simply sends an acknowledgement if the sequence number received has already been processed (e.g., the acknowledgement was lost). The protocol then attempts to retry, so long as the link remains functional. If the link malfunctions (e.g., after a certain number of retransmission attempts), another associated process assumes (or detects) a failure and attempts recovery. During the blocking period, any requests received from the authentication process to the SXP process is queued and the requests sent as multiple TLVs within the same packet(s).

SXP Failure Scenarios

The following are examples of SXP failure scenarios that are analyzed in the following sections:

Link flaps
Proxy (distribution layer network device) failure
Access layer network device failure
Operational (hardware) failures Link Flaps A link flap is detected by the affected hardware. Having detected this situation, the hardware sends the software an interrupt upon such an event. When a single uplink flaps, and the affected uplink is not the last uplink connecting the distribution and access layer network devices, two possibilities present themselves. The first possibility is that the affected uplink wasn't being used as the vehicle for SXP transmission and, if so, the link flap has no has no impact on the communications between the distribution and access layer network devices with regard to SXP. The second possibility is that the uplink was being used as the SXP transmission vehicle, and so the access layer network device will use one of the remaining links supporting SXP communications the distribution and access layer switches together.

When the last link coupling the distribution layer and access layer network devices fails, the distribution layer switch purges the assignments installed from that particular access layer network device. The access layer network device treats this scenario as a distribution layer switch failure.

Proxy (Distribution Layer Switch) Failure

In the case in which the distribution layer network device fails, the failure is detected by the access layer switch through either a link failure (in the manner of a link flap) or through the sequence number timeout employed in the SXP reliable transmission technique. Upon detecting such an event, the access layer switch purges state information related to the SXP session with that particular distribution layer network device. The authentication state for the locally authenticated devices is kept in the same manner as a non-SXP capable system. When the distribution layer switch comes back online, the access switch re-transmits the authentication state for the authenticated devices. It should be noted that, in implementation, the use of this approach implies that the SXP subsystem is initialized before the link is enabled.

Access Layer Switch Failure

When the access switch fails, it is detected by the distribution layer switch through a link failure. The distribution layer switch will retain all of the state associated with that access switch until the link flaps. At that point, it will purge all of the associated state in the same manner as done for link flaps.

Operational Failure

Miscellaneous operational failures such as the exhaustion of hardware resources result in the distribution layer network device sending an Error TLV to the appropriate access layer network device. The error code is passed as part of the TLV and the action decision is left up to the access layer network device. In most instances, a decision to shutdown the port of the network device attempting to authenticate or assigning the device to a default low security level (previously installed) is the preferable solution, from a security standpoint.

SXP High Availability Considerations

High Availability in the Distribution Layer

To create a highly available distribution layer network device, the distribution layer network device can synchronize the SXP state from the active route processor (RP) to its standby RP. In doing so, the distribution layer network device should also keep the links to the access layer network device operational in order to prevent the access layer network device from purging its state. An alternative to synchronizing the entire state is to use the Retransmit Database TLV, which causes the access layer network device to resend all of the current assignments. In this case, the uplink still needs to remain operational upon RP switchover.

A protocol embodying the present invention, such as SXP, should be enabled on the uplinks to each distribution layer network device to which the access network device in question is coupled. Since, in the embodiment currently being discussed, a protocol such as SXP typically resides at the link layer of the protocol stack, SXP will employ links that are blocked by spanning tree. This enables SXP to provide stateful switchover upon a distribution layer switch failure.

High Availability in the Access Layer

An ever-present goal in networking is high availability. To achieve high availability within an access layer network device employing a protocol of the present invention, redundant supervisors can be used. In this scenario, SXP as well as the authentication infrastructure can be implemented to support a stateful switchover (SSO) model, as supported by the network operating system employed. In one embodiment, the additional state required by SXP is the state of the uplinks to the distribution layer network device and an additional indication as to whether the particular authentication has been successfully sent to the distribution layer network device.

An Example of the Operation of an SXP Implementation

Figure 8:
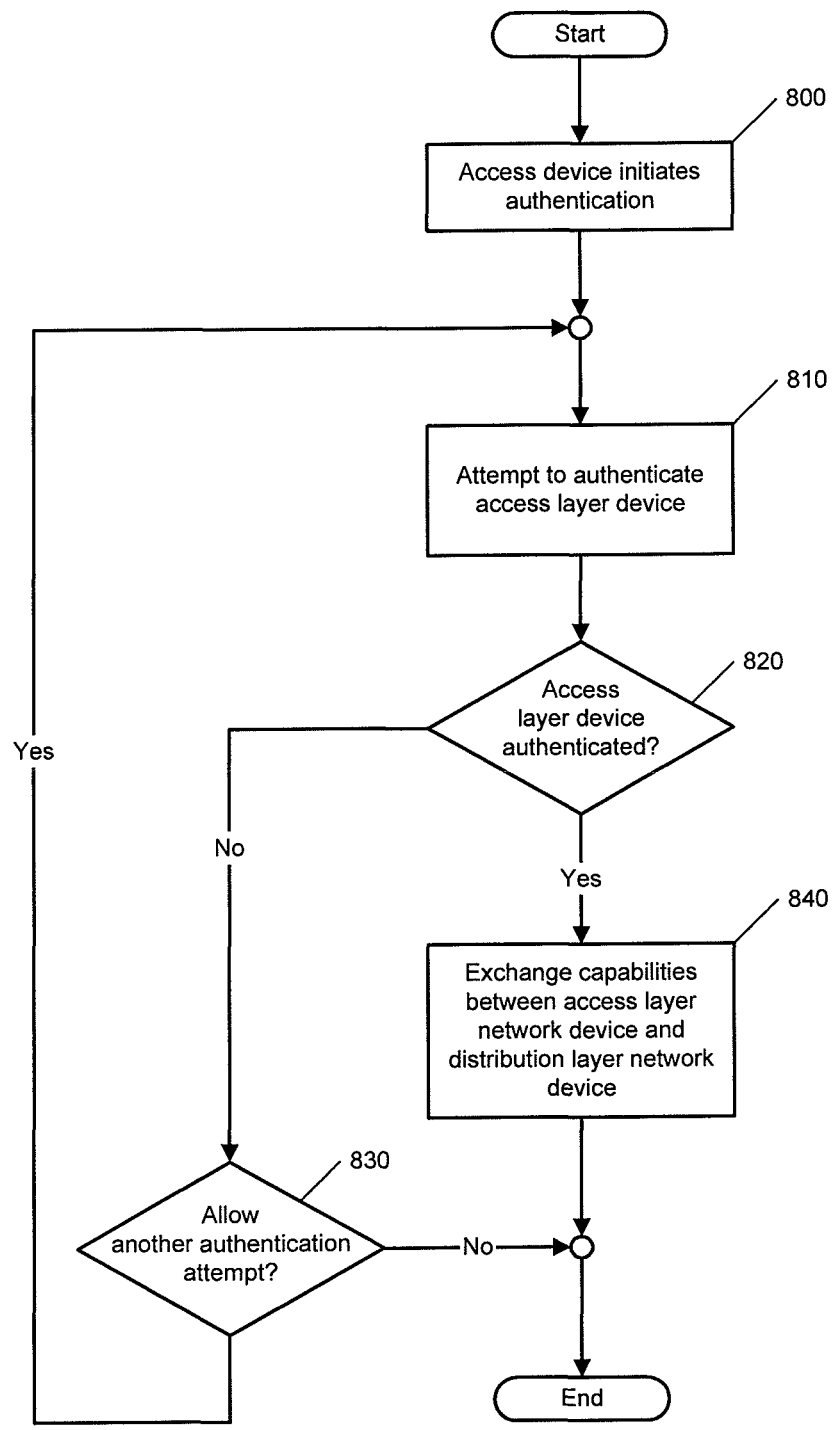
FIG. 8 is a flow diagram illustrating an example of processing performed in the authentication of an access layer network device according to embodiments of the present invention.

FIG. 8 is a flow diagram illustrating an example of the operation of the network architecture of FIG. 7, in which user authentication is performed in a manner similar to that presented in connection with FIGS. 1B and 1C. The process begins with a host (e.g., host 705) initiating the authentication process (step 800). Next, a challenge is issued from an associated authentication server (e.g., authentication server 715), which challenges the entity (e.g., a user) for authenticating information (e.g., the user's user name and password), again, in the manner described in connection with FIGS. 1B and 1C (step 810). In response to this challenge, the entity (user) supplies the requisite authenticating information (e.g., username and password). A determination is then made by the authentication as to whether the authentication server can authenticate the entity (user) (step 820). If the entity (user) cannot be authenticated, a determination is then made as to whether the entity (user) should be allowed another authentication attempt (e.g., to re-enter their username and password) (step 830). If the re-entry of this information is permitted, the process loops to the step of challenging of the entity (user) by authentication server 170 (step 810). Otherwise (e.g., if either re-entry has been attempted a maximum a number of times0 or is not allowed at all), the process concludes.

Alternatively, if the user is successfully authenticated (step 820), the entity is granted access to the network (e.g., the user is permitted to log in, which is accomplished by forwarding access acceptance to the host (step 840). Additionally, at this point, capabilities are exchanged between the access layer network device and the distribution layer network device using functions provided by the protocol implemented according to an embodiment of the present invention (e.g., SXP initialization functions) (step 840). This completes the process of authentication.

Figure 9:
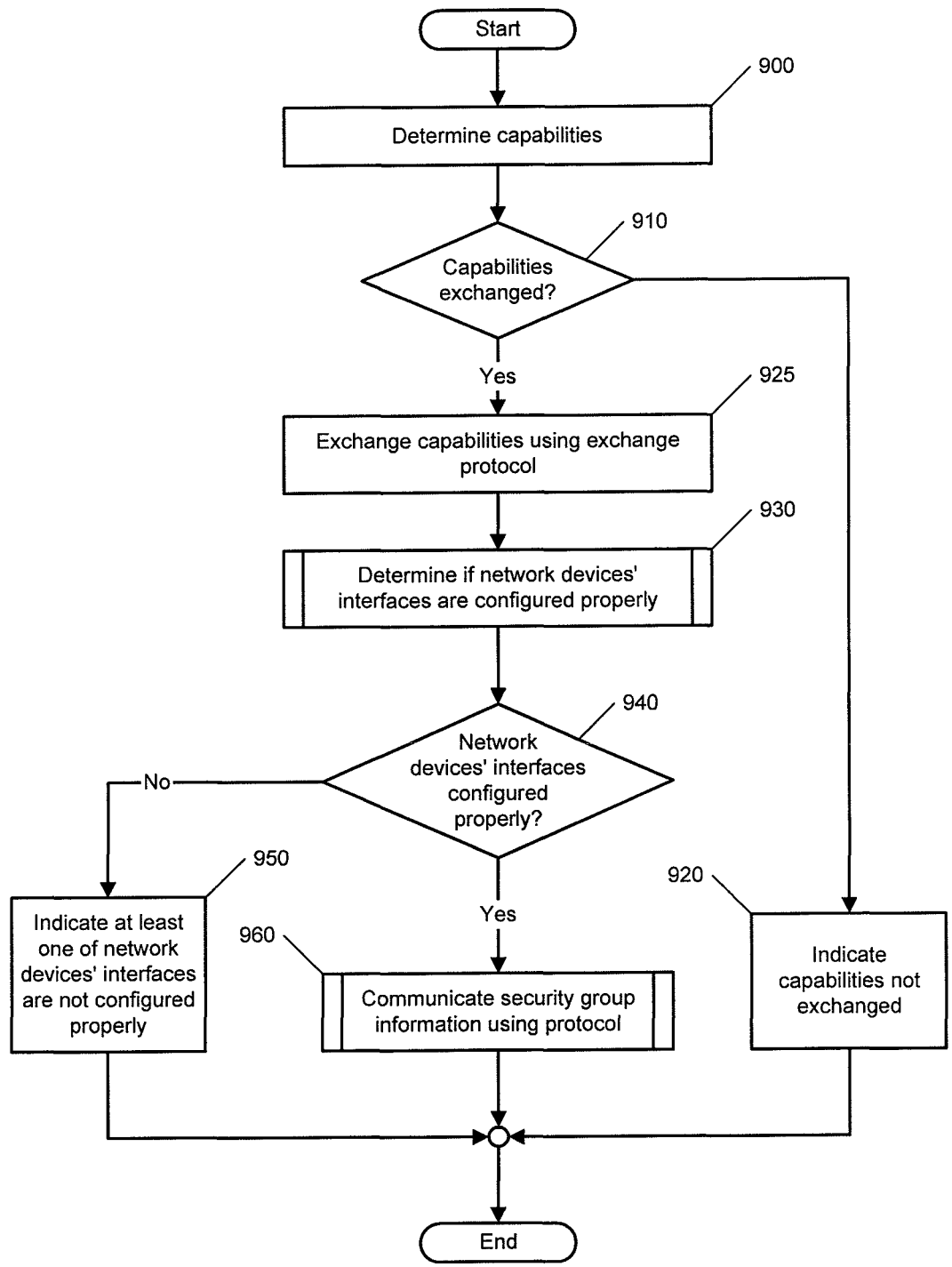
FIG. 9 is a flow diagram illustrating an example of interface negotiations of a protocol according to embodiments of the present invention.

FIG. 9 is a flow diagram illustrating an example of interface negotiations of a protocol according to embodiments of the present invention. The process begins with a determination of the capabilities supported by each network device by the other. This determination is made by each network device that will employ a protocol such as SXP in communicating security group information with other devices supporting such a protocol and having a need to communicate such information in this manner (step 900). For example, such determinations are made, in one scenario, by an access layer switch (e.g., a switch such as one or both of switches 720 and 735) and a distribution layer switch (e.g., a router such as one or both of routers 755 and 760).

Once each of the network devices that are to communicate security group information with one another have made their respective determinations (step 900), a determination is made as to the exchange of these capabilities (step 910). If one or both of the network devices in question have not and/or cannot exchange the requisite information regarding their respective capabilities (step 910), an indication is made that such capabilities have not been exchanged (step 920). The exchange having failed, the process concludes. If, however, each network device is capable of exchanging the capabilities in question (step 910), the exchange of these capabilities is then performed (step 925).

Next, a determination is made as to whether the network devices' respective interfaces are properly configured (step 930). If one or both of the network devices' interfaces are not configured properly (step 940), an indication to this effect is issued (i.e., that at least one of the network devices' interfaces are not properly configured) (step 950). On the other hand, if both network devices' interfaces are properly configured (step 940), security group information can then be (and is) communicated between the network devices using the protocol (e.g., SXP) (step 960).

Figure 10:
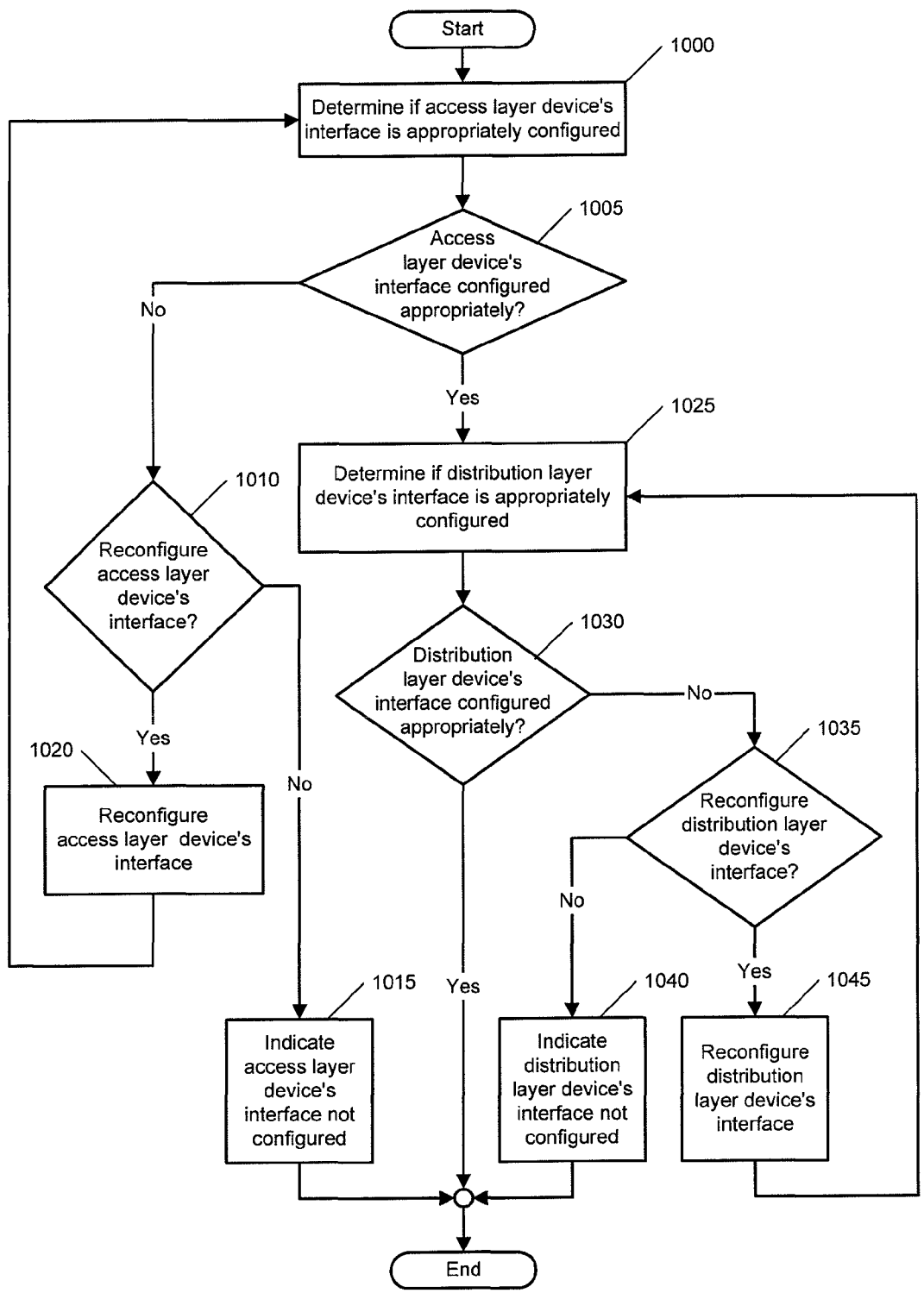
FIG. 10 is a flow diagram illustrating an example of interface configuration according to embodiments of the present invention.

FIG. 10 is a flow diagram illustrating an example of an interface configuration process according to embodiments of the present invention. The process of interface configuration depicted in FIG. 10 begins with a determination as to whether the access layer device's interface is appropriately configured (step 1000). If the access layer device's interface is not configured appropriately (step 1005), a determination is made as to whether access layer devices' interface should be reconfigured (step 1010). If the access layer device's interface should not (or cannot) be reconfigured (step 1010), an indication is made that reflects the fact that the access layer device's interface is not configured (step 1015). The process then comes to an end. If, however, the access layer device's interface is to be reconfigured (step 1010), the operations necessary to reconfigure the access layer device's interface are performed (step 1020). The process then loops back to the initial determination, as to whether the access layer device's interface is appropriately configured (step 1000). The decision with regard to the access layer device's interface being configured appropriately is once again addressed (step 1005).

In this example, the reconfiguration of the access layer device's interface having been successful in this iteration (or the access layer device's interface having been configured appropriately to begin with) (step 1005), a determination is made as to whether the distribution layer device's interface is configured appropriately (step 1025). Based on this determination, a decision is made as to whether the distribution layer device's interface is configured appropriately (step 1030). If the distribution layer device's interface is appropriately configured (step 1030), the process concludes, this being as a result of the appropriate configuration of both the access layer's interface and the distribution layer's interface.

However, if it is determined that the distribution layer device's interface is not configured appropriately (step 1030), a determination is then made as to whether the distribution layer device's interface should be (and/or can be) reconfigured, in an attempt to appropriately configure the distribution layer's interface (step 1035). If the distribution layer device's interface cannot (or should not) be reconfigured (step 1035), an indication is made as to the fact that the distribution layer device's interface is not configured appropriately (step 1040). Subsequently, the process concludes.

If a reconfiguration of the distribution layer device's interface can be performed (step 1035), such reconfiguration of the distribution layer device's interface is attempted (step 1040). At this point, the aforementioned determination regarding the distribution layer device's interface being appropriately configured is once again performed (step 1025). Also as before, an inquiry as to the success of the configuration attempt is then made (step 1030). In this example, upon the successful configuration of the distribution layer device's interface (step 1030), the process concludes. Thus, the process of interface configuration being successful with regard to both the access layer device and distribution layer device leads to the successful conclusion of the process depicted in FIG. 10. Transactions between the access layer device and distribution layer device can then proceed according to the protocol definition (e.g., the definition of SXP described earlier herein).

Figure 11:
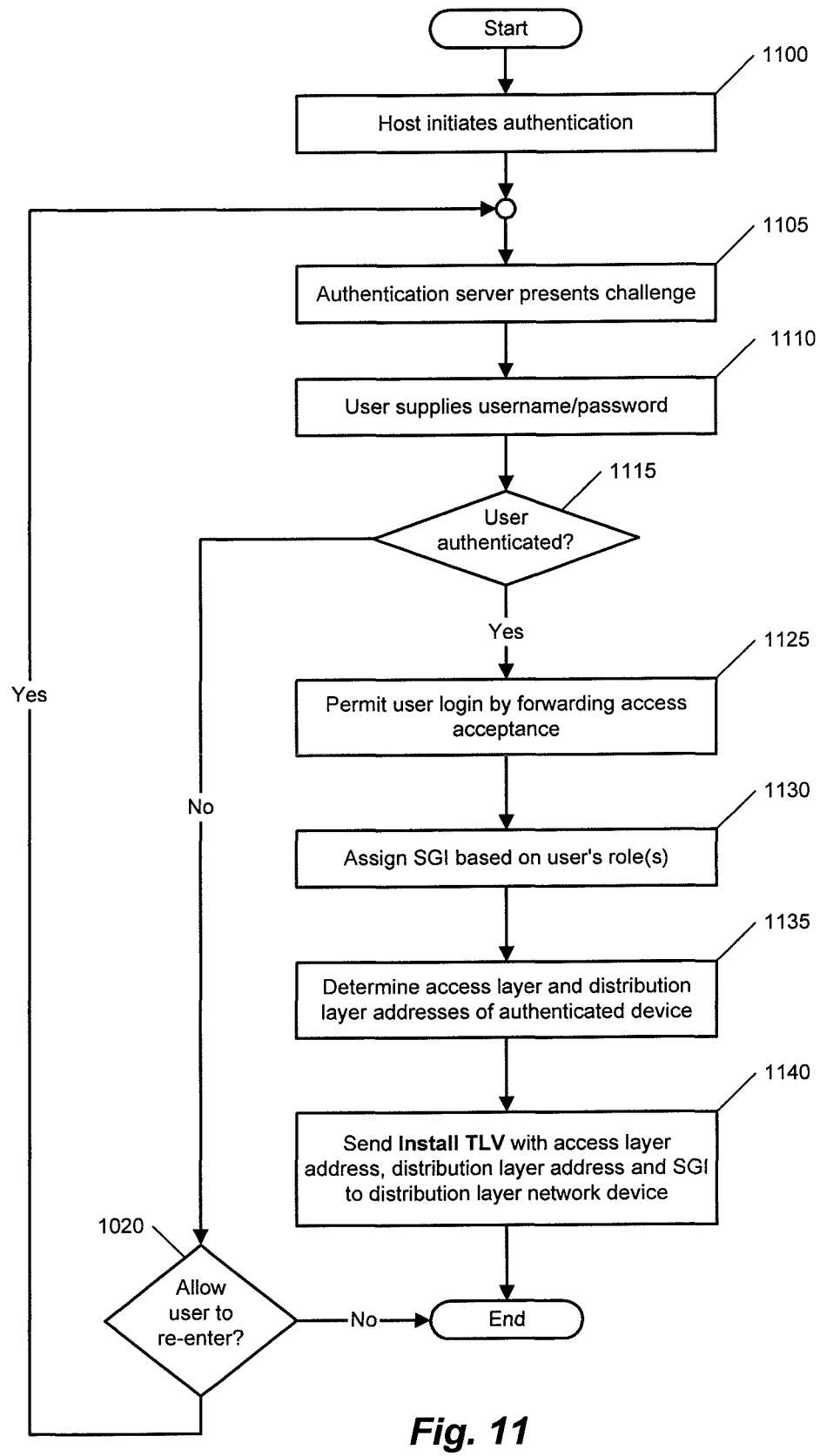
FIG. 11 is a flow diagram illustrating an example of user authentication according to embodiments of the present invention.

FIG. 11 is a flow diagram illustrating an example of the operation of a host-side sub-network that employs a protocol of the present invention (e.g., SXP) such as that described above, to effect the propagation of security group information. The process begins with the host initiating the authentication process (step 1100). Next, a challenge is issued from an authentication server, to challenge the entity requesting access (step 1105). In the example depicted in FIG. 11, this takes the form of requesting that the user provide their user name and password. In response to this challenge, the requested/appropriate information (continuing with the example depicted in FIG. 11, the user supplies their username and password) (step 1110). A determination is then made as to whether the authentication server can authenticate the entity (e.g., user) requesting access (step 1115). If the entity (e.g., user) cannot be authenticated, a determination is made as to whether not to allow the entity (e.g., user) to re-enter their authentication information (e.g., username and password) (step 1120). If the re-entry of this information is acceptable, process proceeds with the authentication server once again presenting a challenge to the entity (e.g., user) (step 1105). Otherwise (e.g., if either this re-entry has been allowed a maximum a number of times, re-entry is not allowed or the like), the process concludes.

Alternatively, if authenticated (step 1115), the entity (e.g., user) is permitted access to the network (e.g., to log in). This is accomplished by forwarding access acceptance to the host (step 1125). Additionally, security group information (e.g., an SGI) is assigned to the host, based on information such as the user's role(s) (step 1130). A determination is then made as to the access layer and distribution layer addresses of the authenticated device (step 1135). Once these addresses have been determined, an install TLV is sent with the access layer address, the distribution layer address and SGI (e.g., the information to be associated with a packet from this source, referred to herein as an SGT), to the distribution layer network device using a protocol according to the present invention (e.g., via SXP) (step 1140). Thus, the access layer device maintains the requisite information (e.g., in memory, by way of (easily distributed and maintained) software functionality). The access layer device then passes this information to the distribution layer device using a protocol according to an embodiment of the present invention. The distribution layer device is then able to perform the requisite packet processing on packets sourced by the host in question (and those destined for the host in question), on behalf of that host, in the manner described previously. This completes the login process.

Figure 12:
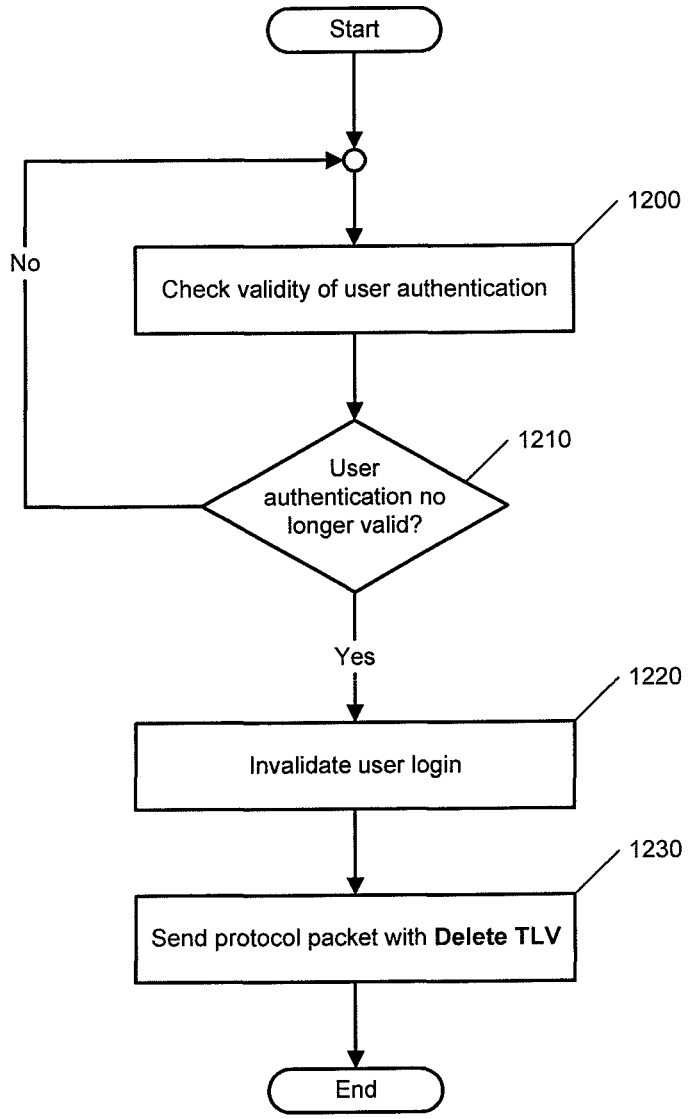
FIG. 12 is a flow diagram illustrating an example of actions taken in the case of user authentication being invalidated, according to embodiments of the present invention.

FIG. 12 is a flow diagram illustrating an example of the actions taken in the case of authentication being invalidated, according to the embodiments of the present invention. Such invalidation might occur as a result of a user logging out, a host malfunctioning or for some other reason. The primary thrust here is that the authentication be invalidated in a timely manner, to avoid security issues related to a "rogue login," associated with no entity actually accessing the network. The process of FIG. 12 begins with the validity of the entity's (e.g., user's) authentication being checked (step 1200). A determination is then made as to whether authentication continues to be valid (step 1210). If this determination indicates that the user authentication is valid (step 1210), the process loops and repeats the validity check of the entity's (e.g., user's) authentication (step 1200), thereby continually checking on the validity of the entities logged into the network via the given access layer device. However, if the entity's (e.g., user's) authentication is no longer valid (step 1210), the entity's (e.g., user's) login is invalidated (step 1220). According to the protocols of the present invention, a protocol packet is then sent containing a delete TLV (step 1230). Once the entity's (e.g., user's) login is invalidated and the delete TLV message sent, the process concludes.

Figure 13:
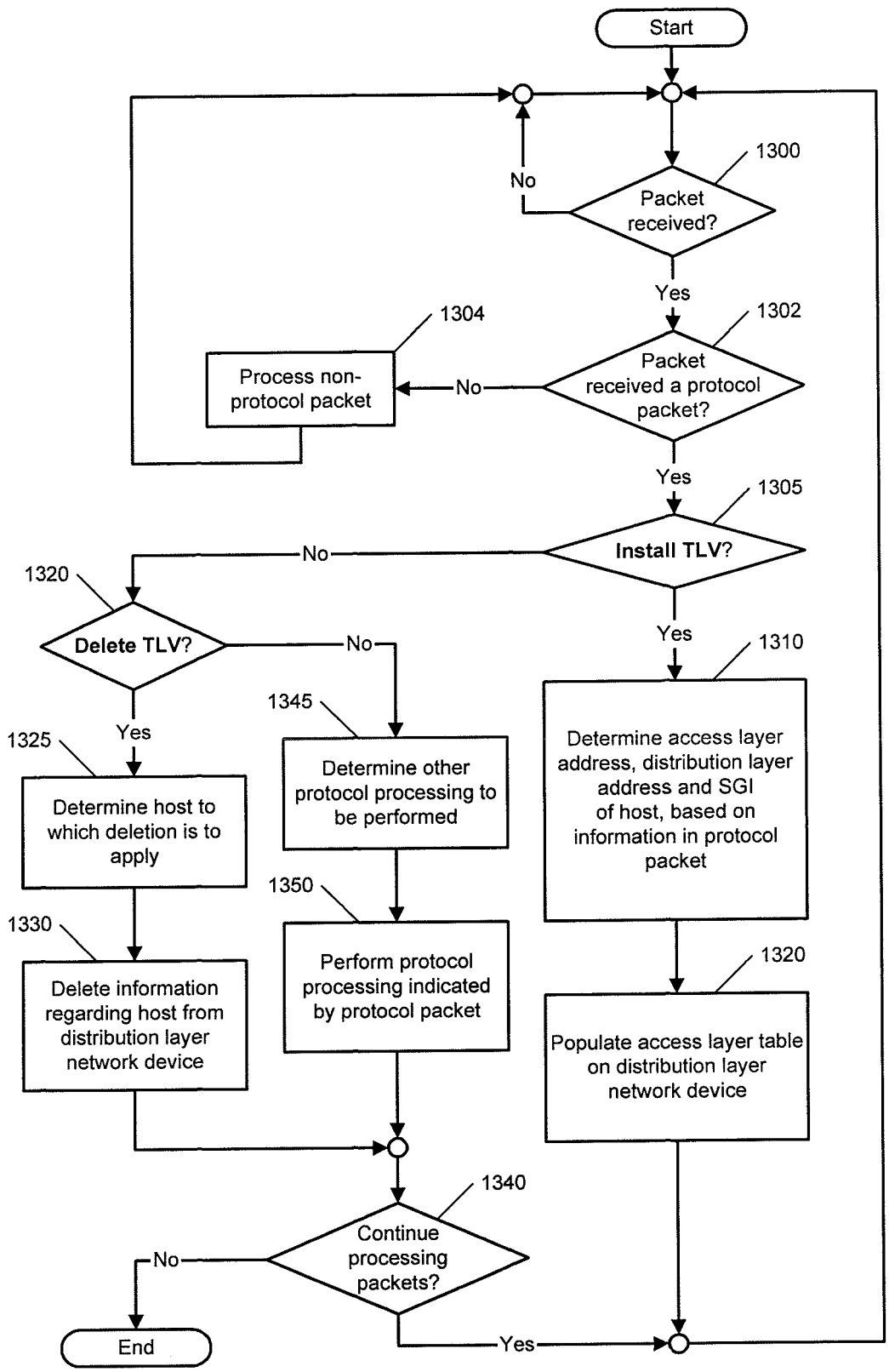
FIG. 13 is a flow diagram illustrating an example of communications according to a protocol of the present invention.

FIG. 13 is a flow diagram illustrating an example of communications between an access layer device and a distribution layer device according to a protocol of the present invention, in which protocol messages are processed. The processing of protocol communications depicted in FIG. 13 begins with a determination as to whether a packet has been received (step 1300). A determination is then made as to the packet thus received is a protocol packet (step 1302). This, in effect, is an operation in which a packet, having been received, is analyzed in order to determine whether the packet is a protocol packet (e.g., SXP packet) or another type of packet. If the packet received is not a protocol packet, the packet thus received is processed as the packet would normally be processed (step 1304). The process then awaits the receipt of another packet. However, if the packet received is a protocol packet (step 1302), a determination is then made as to whether the protocol packet is an install TLV protocol packet (step 1305).

If the packet received is an install TLV protocol packet (step 1305), the access layer address, distribution layer address and security group information (SGI) of the host (in this example, the network device sourcing the packet) are determined, based on information contained in the protocol packet (step 1310). Next, using this information, the access layer table on the distribution layer network device is populated (step 1315). As noted, in the embodiment provided here as an example, and so it will be apparent, in light of the present disclosure, that the information can include additional information, or one or more pieces of the described information could be omitted or sent separately. Moreover, it will also be appreciated in like fashion that the network device to which the information is sent, and the manner/location in which the information is stored, can be altered while remaining within the intended scope of the accompanying claims. The operations associated with the install TLV having being performed, the process loops back to its beginning, awaiting the receipt of the next protocol packet (step 1300).

If, however, the protocol packet received (step 1302) is not an install TLV protocol packet (step 1305), a determination is made as to whether the protocol packet received is a delete TLV protocol packet (step 1320). If the protocol packet received is a delete TLV protocol packet (step 1320), a determination is made as to which host the deletion operation is to apply (step 1325). Once the identity of the affected host is determined (step 1325), information regarding the host is deleted from the appropriate device (e.g., the distribution layer network device in question) (step 1330). Once the information regarding the entity in question (e.g., a network device such as a host) has been deleted from the distribution layer network device (step 1330), a determination is made as to whether the network device should continue processing protocol packets (step 1340). If the network device in question is to discontinue processing protocol packets (step 1340), the process concludes. However, if the network device in question is to continue processing protocol packets (step 1340), the process loops to the point of awaiting the next protocol packet (step 1300).

If the protocol packet received is not a delete TLV protocol packet (step 1320), a determination is made as to the protocol processing that is to be performed, as represented by the information contained in the protocol packet (step 1345). Once this determination has been made, the requisite protocol processing, as indicated by the protocol packet, is performed (step 1350). Such protocol processing can include, for example, the Delete All TLV, the Error TLV, or the Retransmit Database TLV (as noted earlier), as well as other TLV's that might be necessary to supporting the conveyance of information between the given access layer switch and distribution layer switch.

Figure 14:
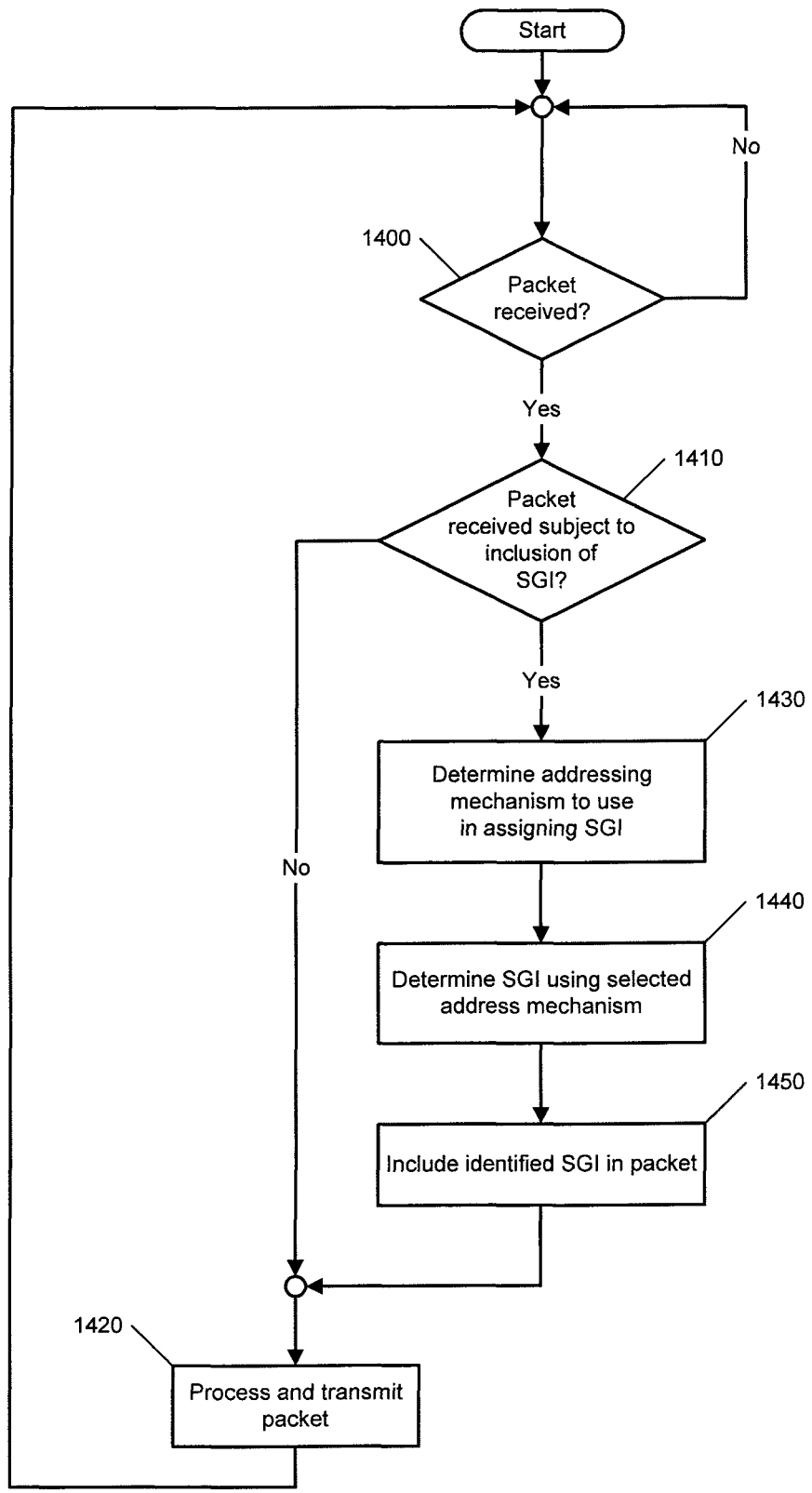
FIG. 14 is a flow diagram illustrating an example of packet processing performed according to a protocol of the present invention.

FIG. 14 is a flow diagram illustrating an example of packet processing performed by a distribution layer switch (e.g., a router), for example, according to a protocol of the present invention. In the scenario presented in this example, the distribution layer switch security includes group information in the given packet, and does so only if such inclusion is appropriate. Other, alternative paradigms will be apparent in this regard, in light of the present disclosure. The given process, as depicted in FIG. 14, begins with a determination as to whether a packet has been received (step 1400). If a packet has not yet been received, the network device awaits the receipt of a packet by looping until a packet is received (step 1400). Once a packet has been received (step 1400), a determination is made as to whether the packet received is to be subject to the inclusion of security group information (step 1410). If the packet received is not to have security group information included therein (step 1410), the packet received is processed and transmitted in the usual manner (step 1420).

However, if the packet received is to have security group information included therein (step 1410), a determination is made as to the addressing mechanism to be employed in assigning the security group information (step 1430). Once the addressing mechanism is determined (step 1430), the security group information to be included in the packet is determined using the selected address mechanism (step 1440). Having determined the security group information to be included (step 1440), the security group information thus identified is included in the packet (step 1450). The packet is then processed and transmitted in the usual manner (step 1420).

Figure 15:
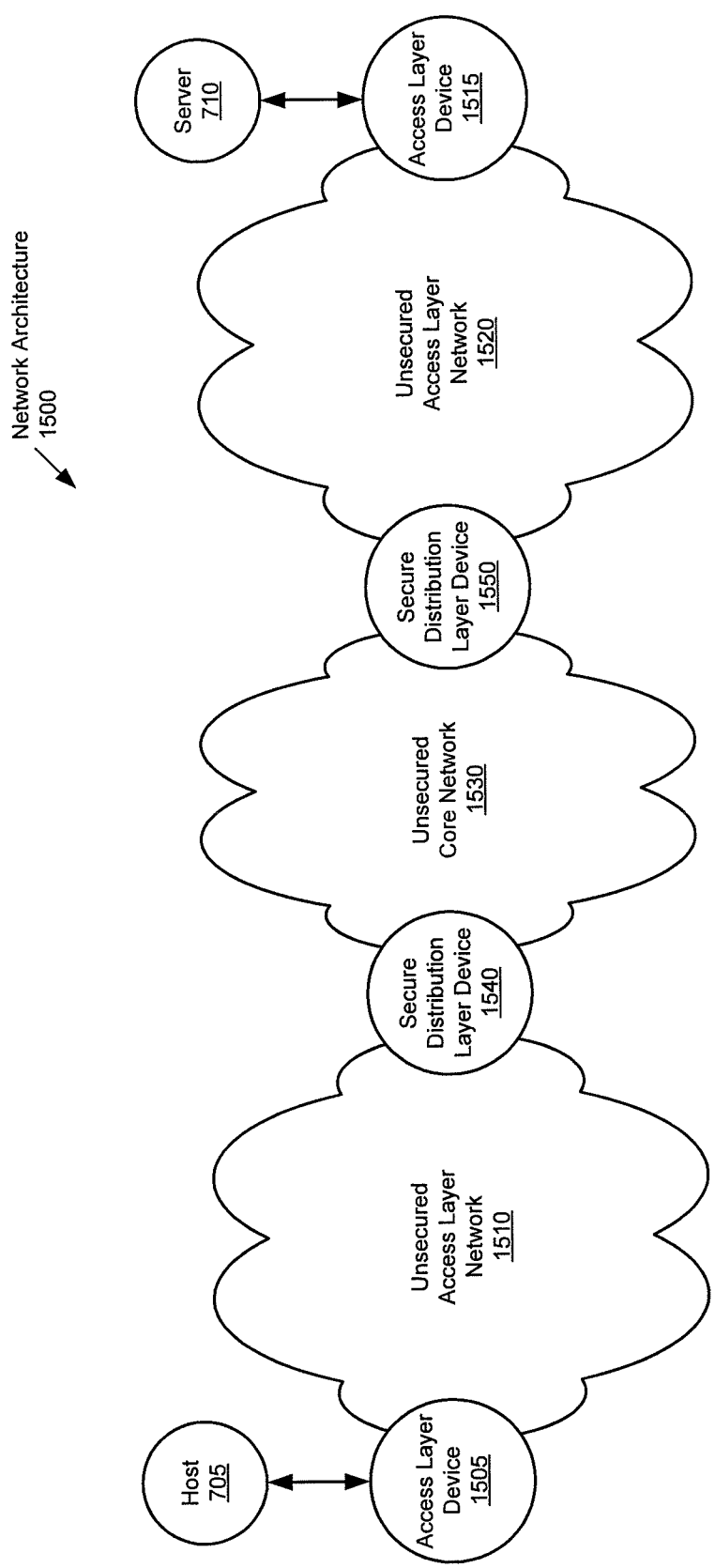
FIG. 15 is a diagram illustrating an example of a network architecture in which the present invention can be practiced, in which security is maintained only as to the ingress and egress network devices.

FIG. 15 is a block diagram illustrating an example of a network architecture in which the present invention can be practiced, in which security is maintained only as to the ingress and egress network devices. As will be appreciated, and in fact, as is reflected in the numbering of the elements of FIG. 15, the network architecture depicted in FIG. 15 (depicted in FIG. 15 as a network architecture 1500) is a variation of the network architecture depicted in FIG. 7 as network architecture 700. Thus, host 705 communicates with server 710 over a network path similar to that depicted by the path taken by packet 770/packet 785 through network architecture 700 in FIG. 7. In this regard, host 705 is coupled to an access layer device 1505 (such as switch 720 of FIG. 7), which is in turn coupled to an unsecured access layer network 1510. As will be appreciated, unsecured access layer network 1510 loosely corresponds to sub-network 725 in FIG. 7. Similarly, server 710 is coupled to an access layer device 1515 (such as switch 735 of FIG. 7), which is in turn coupled to an unsecured access layer network 1520. Again, as will be appreciated, unsecured access layer network 1520 loosely corresponds to sub-network 740 of FIG. 7. Unsecured access layer network 1510 and unsecured access layer network 1520 are coupled to one another via an unsecured core network 1530 by a secure distribution layer device 1540 and a distribution layer device 1550, respectively.

As will be appreciated in light of the present disclosure, an embodiment of a network architecture (e.g., network architecture 1500) that comprehends a minimum configuration of secure network devices needed to implement a network security paradigm based on the present invention may, in fact, present a number of desirable qualities. These include minimizing the disruption engendered by upgrading hardware to support a security paradigm such as that supported by the present invention, maximizing the number of network devices that need only to have their respective software upgraded (taken to be less disruptive, logistically less intensive, involving fewer resources and so on), and other simplifications that result in a reduction in the impact of such upgrades. However, as can be seen in FIG. 15, the core network (in this case, unsecured core network 1530) in such a configuration is left unsecured.

Thus, at what would likely be the practical minimum, secure distribution layer device 1540 and secure distribution layer device 1550 are, as their designation implies, be secure devices. Of note at this juncture is that, in this particular example, the term "secure network device" is taken to mean a network device that is capable of performing the requisite processing of packets having security group information associated therewith, as would be expected of the given network device in this architecture (i.e., security group (SG)-capable). In contrast, other network devices are unable to perform the processing that would typically be expected of such network devices in such a scenario, and so are not capable of performing the requisite processing of packets having security group information associated therewith (non-SG-capable). It will be appreciated, however, in light of the present disclosure, that such non-SG-capable may well be cognizant of security group information, and so be able to take some actions with respect thereto (e.g., storing and forwarding some or all such security group information, although being unable to perform any packet processing based on that security group information).

In this regard, with respect to the scenario depicted in FIG. 15, in which the network devices of unsecured core network 1530, save for secure distribution layer device 1540 and 1550, are non-SG-capable, a technique for communicating security group information between secure distribution layer device 1540 and 1550, as well as maintaining packet security of the packet conveyed therebetween, is needed. Such techniques are, in fact, available. An example of a method and system that can be used in implementing the secure forwarding of packets over an unsecure network is described in patent application Ser. No. 10/996,102, filed Nov. 23, 2004, and entitled "Method And System For Including Security Information With A Packet," having M. Smith, P. Nallur, W. Kok and M. Fine as inventors. This application is hereby incorporated by reference herein, in its entirety and for all purposes.

Thus, an embodiment of the present invention can be employed to store the requisite security group information at access layer device 1505, and convey that security group information to secure distribution layer device 1540, thereby allowing secure distribution layer device 1540 to perform the requisite security group processing on behalf of access layer device 1505. Having performed the requisite security-group-related processing on the packet in question (e.g., the insertion of an SGT into the packet), the packet is ready to be sent to its destination. Unfortunately, as noted, the intervening core network may be, as depicted in FIG. 15, an unsecured core network (unsecured core network 1530). However, this obstacle can be overcome using a technique such as that disclosed in patent application Ser. No. 10/996,102, entitled "Method And System For Including Security Information With A Packet," as previously included by reference. Using such a technique provides an avenue for securely conveying the now-processed packet to the egress network device (e.g., secure distribution layer device 1550) in a manner that allows the egress network device (e.g., secure distribution layer device 1550) to deal with the packet as if the packet had been sent across a SG-capable network. This, despite the fact that the intervening core network (unsecured core network 1530) is not secure, within the aforementioned meaning of the term.

Two alternatives present themselves at this juncture. In the first, secure distribution layer device 1550, having received the now-processed packet, performs the requisite security group processing in a manner such as that described previously. As noted earlier, such processing can be performed, for example, in accordance with the examples of egress filtering given in patent application Ser. No. 10/659,614, entitled "Method and Apparatus for Providing Network Security Using Role-Based Access Control," as previously included by reference herein. This is referred to herein as egress progressing.

An alternative to the foregoing paradigm is the use of what is referred to herein as ingress filtering. Such an approach proceeds in the manner just described, with the requisite information being communicated as necessary. However, rather than forwarding the packet through unsecured core network 1530, to be filtered by the egress network device (e.g., secure distribution layer device 1550), the packet in question if filtered at the ingress node (e.g., secure distribution layer device 1540). An example of a protocol and architecture that can be used in implementing ingress filtering can be found in patent application Ser. No. 11/000,706 and entitled "Method And Apparatus For Ingress Filtering Using Security Group Information," as previously included by reference herein.

Yet another permutation employing the present invention is the performance of egress filtering in the case in which the ingress node (e.g., secure distribution layer device 1540) is non-SG-capable. As will be appreciated, depending upon limitations in the capabilities of secure distribution layer device 1540 (e.g., in the case in which secure distribution layer device 1540 does not support (or has not been upgraded to support) the processing of security group information), the security group information processing duties of secure distribution layer device 1540 may need to be performed by another of the network devices of network architecture 1500. Typically, the simplest solution will be to task secure distribution layer device 1550 with such duties. Thus, in the example presented by network architecture 1500, the logical candidate for performing such security group information processing would be secure distribution layer device 1550. Reassigning the security group information processing duties at issue to secure distribution layer device 1550 would, obviously, relieve "secure" distribution layer device 1540 (no longer "secure," in fact, according to the aforementioned definition of that term) of such responsibilities, but would necessitate the implementation of a method that allowed secure distribution layer device 1540 to communicate the security group information needed by secure distribution layer device 1550, to secure distribution layer device 1550. As will be appreciated, an embodiment of the protocol that is the subject of the present invention would serve such a purpose quite well. Such an architecture would thus extend the theoretical minimum number of "secure" network devices still further, to a single SG-capable distribution layer device (as used in this embodiment), that device being the egress network device (egress being relative to the host/server pair, and so, in the present example, secure distribution layer device 1550).

In this scenario, an embodiment of the protocol of the present invention is employed not only between access layer device 1505 and distribution layer device 1540 (referred to as such, rather than as a "secure distribution layer device," because in the present example, this network device is not secure within the meaning of the present scenario (i.e., does not support security group information processing as was the case in the scenarios described earlier herein), as noted earlier), but is also employed between distribution layer device 1540 and secure distribution layer device 1550. It will be appreciated that secure distribution layer device 1550 therefore continues to be referred to as "secure". It will be noted that, distribution layer device 1540, though not able to perform the security group information processing, is still capable of maintaining the requisite security group information, in the manner discussed earlier with regard to access layer device 1515).

Thus, as discussed earlier, access layer device 1505 maintains the requisite security group information, and forwards this security group information to distribution layer device 1540. In turn, distribution layer device 1540 also maintains the requisite security group information in a similar fashion, and forwards this security group information to distribution layer device 1550. Now having the requisite security group information, distribution layer device 1550 is able to perform egress security group information processing, using the techniques noted earlier herein. Once again, an example of egress filtering using security group information is provided in patent application Ser. No. 10/659,614, entitled "Method and Apparatus for Providing Network Security Using Role-Based Access Control," as previously included by reference herein. Such an approach allows the security methods embodied by the present invention to be implemented using a "bare bones" approach, in which only a single distribution layer device has the hardware necessary to perform the aforementioned processing.

These, as well as other alternative embodiments of the present invention that can be employed in providing network security, highlight the flexibility with which a security paradigm based on the present invention can be introduced into existing networks. As has been noted, while improving network security is desirable, if course, such improvements necessarily come at a cost (logistical, financial and otherwise), even when network security improvements can be implemented incrementally using embodiments of the present invention (which, to a significant degree, significantly moderates the impact of such modifications). Thus, the more gradually such paradigms can be introduced, the less disruption will be caused by their implementation. This makes techniques such as those disclosed (and referred to) herein attractive to an enterprise considering such improvements. As will therefore be appreciated, not even considering the novelty, beneficial features and other advantages of such techniques, minimizing the impact on an organization implementing such techniques can be expected to result in the solution being more readily adopted, thus increasing the value of that solution to the organization. Such ready adoption translates into the commercial success such a solution can reasonably be expected to enjoy.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A method comprising:
    receiving address information regarding a network device and security group information regarding said network device, wherein
        said address information and said security group information are configured to be received from a first network device, said address information and said security group information are received at a second network device,
said address information identifies an address of said network device,
said security group information identifies a security group of said network device, and
said security group information indicates said network device is a member of said security group;
associating said address information and said security group information, wherein
said second network device is configured to perform said associating,
said associating comprises
storing said address information and said security group information such that said address information and said security group information are associated with one another, and
said address information and said security group information are configured to allow said security group information to be used in performing access control processing of a packet;
receiving another packet at said second network device, wherein
said another packet is received from said first network device;
determining whether said security group information should be associated with said another packet, wherein
said another packet comprises packet address information,
said packet address information is address information associated with said network device, and
said determining uses said packet address information; and
in response to an indication that said security group information should be associated with said another packet, associating said security group information with said another packet, wherein
said associating said security group information with said another packet comprises
adding said security group information to said another packet.

2. The method of claim 1, further comprising:
sending said address information and said security group information from said first network device to said second network device, wherein
said second network device is configured to associate said address information and said security group information with one another, by virtue of being configured to perform said associating said address information and said security group information.

3. The method of claim 1, wherein said sending comprises:
receiving an install message from said first network device at a second network device, wherein
said install message comprises
said address information, and
said security group information, and
said install message is configured to cause said second network device to perform said associating said address information and said security group information.

4. The method of claim 3, further comprising:
determining whether said security group is valid; and
in response to a determination that said security group is invalid, awaiting a delete message from said first network device, wherein said associating said address information and said security group information creates an association between said address information and said security group information, and
said delete message is configured to cause said second network device to delete said association.

5. The method of claim 4, wherein
said delete message comprises
said address information, and
said security group information.

6. The method of claim 1, further comprising:
associating an address and said security group information with one another, wherein
said address allows said security group information to be associated with said another packet.

7. The method of claim 6, wherein
said address is at least one of a media access control address, an internet protocol address, or a transport layer port address.

8. The method of claim 1, wherein said adding comprises one of:
inserting said security group information in said another packet; and
encapsulating said another packet, wherein
said encapsulating comprises one of prepending or appending said security group information to said another packet.

9. An apparatus comprising:
a distribution layer network device, wherein
said distribution layer network device is configured to be communicatively coupled to an access layer network device, and
said distribution layer network device is configured to
receive address information regarding a network device and security group information regarding said network device, wherein
said address information and said security group information are received from said access layer network device,
associate said address information and said security group information, wherein
said address information identifies an address of said network device,
said security group information identifies a security group of said network device,
said security group information indicates said network device is a member of said security group,
said distribution layer network device is configured to associate said address information and said security group information by virtue of being configured to
store said address information and said security group information such that said address information and said security group information are associated with one another, and
said address information and said security group information are configured to allow said security group information to be used in performing access control processing of packet,
receive another packet from said access layer network device, wherein
said another packet is received from said first network device,
determine whether said security group information is associated with said another packet, wherein
said another packet comprises packet address information, said packet address information is address information associated with said network device, and said determining uses said packet address information, and in response to an indication that said security group information should be associated with said another packet, associate said security group information with said another packet, wherein security group information is associated with said another packet, at least in part, by adding said security group information to said another packet.

10. The apparatus of claim 9, further comprising:

a first network device, wherein said first network device is said access layer network device, said first network device is configured to identify said address of said network device, wherein said address is identified using address information, identify said security group of said network device, and send said address information and said security group information to said distribution layer network device.

11. An apparatus comprising:

means for receiving address information regarding a network device and security group information regarding said network device, wherein said address information and said security group information are configured to be received from a first network device, said address information and said security group information are received at a second network device comprising said means for receiving, said address information identifies an address of said network device, said security group information identifies a security group of said network device, and said security group information indicates said network device is a member of said security group;

means for associating said address information and said security group information, wherein said second network device comprises said means for associating, said means for associating comprises means for storing said address information and said security group information such that said address information and said security group information are associated with one another, and said address information and said security group information are configured to allow said security group information to be used in performing access control processing of a packet;

means for receiving another packet at said second network device, wherein said another packet is received from said first network device;

means for determining whether said security group information should be associated with said another packet, wherein said another packet comprises packet address information, said packet address information is address information associated with said network device, and said means for determining is configured to use said packet address information to determine whether said security group information should be associated with said another packet; and means, responsive to an indication that said security group information should be associated with said another packet, for associating said security group information with said another packet, wherein said means for associating said security group information with said another packet comprises means for adding said security group information to said another packet.

12. The apparatus of claim 11, wherein said sending comprises:

means for receiving an install message from said first network device at a second network device, wherein said install message comprises said address information, and said security group information, and said install message is configured to cause said second network device to create an association between said address information and said security group information.

13. The apparatus of claim 12, further comprising:

means for determining whether said security group is valid; and means, responsive to a determination that said security group is invalid, for awaiting a delete message from said first network device, wherein said delete message is configured to cause said second network device to delete said association.

* * * * *

UNITED STATES PATENT AND TRADEMARK OFFICE
CERTIFICATE OF CORRECTION

PATENT NO. : 8,713,201 B2  
APPLICATION NO. : 12/788467  
DATED : April 29, 2014  
INVENTOR(S) : Michael R. Smith, Awais B. Nemat and Michael Fine Page 1 of 1

It is certified that error appears in the above-identified patent and that said Letters Patent is hereby corrected as shown below:

In the claims

Column 35  
Line 53, in Claim 3, replace: "claim 1" by -- claim 2 --

Column 36  
Line 62, in Claim 9, replace: "said first" by -- a first --

Column 38  
Line 29, in Claim 12, replace: "wherein said sending comprises:" by -- further comprising: --  
Line 32, in Claim 12, replace: "a second" by -- said second --

Signed and Sealed this  
Nineteenth Day of April, 2016

Michelle K. Lee  
*Director of the United States Patent and Trademark Office*